(12) United States Patent
Di Ponio et al.

(10) Patent No.: US 6,422,657 B2
(45) Date of Patent: Jul. 23, 2002

(54) VEHICLE WHEEL HUB MOUNTING SYSTEM

(75) Inventors: Victor M. Di Ponio, Novi; Thomas A. Straub, Whitmore Lake, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/800,439

(22) Filed: Mar. 6, 2001

Related U.S. Application Data

(63) Continuation of application No. 09/311,005, filed on May 13, 1999, now Pat. No. 6,196,639, which is a continuation of application No. PCT/US97/20944, filed on Nov. 14, 1997.
(60) Provisional application No. 60/030,801, filed on Nov. 14, 1996.

(51) Int. Cl.$^7$ ............................................... B60B 27/00
(52) U.S. Cl. .................................................... 301/105.1
(58) Field of Search ........................... 301/105.1, 124.1, 301/125, 126, 131; 180/252, 258, 259; 188/218 XL; 384/544

(56) References Cited

U.S. PATENT DOCUMENTS

| | | | | |
|---|---|---|---|---|
| 2,271,849 A | * | 2/1942 | Wallace | |
| 2,341,755 A | * | 2/1944 | Ash | |
| 4,282,949 A | * | 8/1981 | Kopich et al. | |
| 4,354,711 A | * | 10/1982 | Main | |
| 4,371,214 A | * | 2/1983 | Strader | |
| 4,792,020 A | * | 12/1988 | Okumura | |
| 5,394,967 A | * | 3/1995 | Bigley | |
| 5,560,687 A | * | 10/1996 | Hagelthorn | |

FOREIGN PATENT DOCUMENTS

| | | | |
|---|---|---|---|
| EP | 65127 | * | 11/1982 |
| EP | 794072 | * | 9/1997 |
| GB | 2112500 | * | 7/1983 |
| GB | 2198995 | * | 6/1988 |
| WO | WO 85/05661 | * | 12/1985 |
| WO | WO 96/14515 | * | 5/1996 |

* cited by examiner

Primary Examiner—Russell D. Stormer
(74) Attorney, Agent, or Firm—MacMillank Sobanski & Todd, LLC

(57) ABSTRACT

An improved vehicle wheel hub mounting system includes a wheel hub, an axle spindle, a bearing assembly, and a threaded fastener. The wheel hub defines an axis and including a generally axially extending body having a bore formed therethrough. The bore of the wheel hub includes an internal splined portion and an inner annular wheel hub surface spaced apart from the internal splined portion. The inner annular wheel hub surface defines a predetermined wheel hub inner diameter. The axle spindle is connected to the wheel hub for rotation therewith and includes a generally axially extending body having an external splined portion and an outer annular axle spindle surface spaced apart from the external splined portion. The external splined portion of the axle spindle matingly receives the internal splined portion of the wheel hub to connect the axle spindle to the wheel hub for rotation therewith. The outer annular axle spindle surface of the axle spindle defines a predetermined axle spindle outer diameter which receives the inner annular wheel hub surface of the wheel hub so as to support the wheel hub thereon. The bearing assembly is pressed onto a portion of one of the wheel hub and the axle spindle and is adapted to be secured to a non-rotatable component of the vehicle so as to rotatably support the wheel hub and the axle spindle relative thereto. The threaded fastener nut is secured to the axle spindle for preloading the bearing assembly and securing the wheel hub and the axle spindle together for rotation with one another.

24 Claims, 10 Drawing Sheets

US 6,422,657 B2

VEHICLE WHEEL HUB MOUNTING SYSTEM

CROSS-REFERENCE TO RELATED APPLICATIONS

This application is a continuation of U.S. Ser. No. 09/311,005, filed May 13, 1999, now U.S. Pat. No. 6,196,639 B1, which is a continuation of PCT/US97/20944, filed Nov. 14, 1997, which claims the benefit of U.S. Provisional Application Ser. No. 60/030,801, filed Nov. 14, 1996.

BACKGROUND OF THE INVENTION

This invention relates in general to vehicle wheel hub mounting systems and in particular to an improved structure for such a vehicle wheel hub mounting system.

One example of a known vehicle wheel hub mounting system, indicated generally at 900, is illustrated in prior art FIG. 10. As shown therein, the prior art vehicle wheel hub mounting system 900 is associated with a driven front wheel of a vehicle and includes an axle spindle or drive shaft 912, a wheel hub 914, a bearing assembly 918, and a spanner nut 920. The axle spindle 912 includes an outer end having external threads 912A, a body having external splines 912B along a portion thereof, and an inner end (not shown) adapted to be connected to an axle (not shown) of the vehicle.

The wheel hub 914 includes internal splines 914A for receiving the mating external splines 912B of the axle spindle 912 for connecting the wheel hub 914 to the axle spindle 912 for rotation therewith. The wheel hub 914 also includes a generally radially outwardly extending flange 914B, and a bearing seat 914D. The wheel hub flange 914B includes a plurality of circumferentially spaced stud receiving holes 914C formed therein (only one of such stud receiving holes 914C is illustrated in FIG. 10). The stud receiving holes 914C are adapted to receive studs (not shown) and nuts (not shown) for securing a rotatable brake component, such as for example a brake rotor (not shown) or a brake drum (not shown), and a vehicle wheel (not shown), to the wheel hub 914 for rotation therewith. The bearing seat 914D is adapted to support the bearing assembly 918 which is in turn, secured to a non-rotatable component of the vehicle (not shown), so as to rotatably support the axle spindle 912 and the wheel hub 914 relative thereto. To secure the axle spindle 912 and the wheel hub 914 together for rotation with one another and also to preload the bearing assembly 918, the spanner nut 920 is installed on the threaded outer end 912A of the axle spindle 912 and tightened to preload the bearing assembly 918 to a predetermined load.

The vehicle wheel hub mounting system 900 is subjected to various loads during vehicle operation. Typically, the loads which the vehicle wheel hub mounting system 900 is subjected to include radial loads, bending loads, and torsional loads. Depending on the magnitude of the associated loads, the spanner nut 920 can rotate from its installed position resulting in the loss of the bearing preload provided by the spanner nut 920. Also, depending on the magnitude of the associated loads, the wheel hub 914 can move relative to the axle spindle 912 resulting in the premature wear of the respective splines 912B and 914A thereof. Thus, it would be desirable to provide an improved structure for a vehicle wheel hub mounting system which improved the retention of the spanner nut on the axle spindle and which reduced the wear of the wheel hub splines and axle spindle splines and yet was simple and inexpensive.

SUMMARY OF THE INVENTION

This invention relates to an improved vehicle wheel hub mounting system and includes a wheel hub, an axle spindle, a bearing assembly, and a threaded fastener. The wheel hub defines an axis and including a generally axially extending body having bore formed therethrough. The bore of the wheel hub includes an internal splined portion and an inner annular wheel hub surface spaced apart from the internal splined portion. The inner annular wheel hub surface defines a predetermined wheel hub inner diameter. The axle spindle is connected to the wheel hub for rotation therewith and includes a generally axially extending body having an external splined portion and an outer annular axle spindle surface spaced apart from the external splined portion. The external splined portion of the axle spindle matingly receives the internal splined portion of the wheel hub to connect the axle spindle to the wheel hub for rotation therewith. The outer annular axle spindle surface of said axle spindle defines a predetermined axle spindle outer diameter which receives the inner annular wheel hub surface of the wheel hub so as to pilot and support the wheel hub thereon. The bearing assembly is pressed onto at least a portion of one of the wheel hub and the axle spindle. The bearing assembly is adapted to be secured to a non-rotatable component of the vehicle so as to rotatably support the wheel hub and the axle spindle relative thereto. The threaded fastener nut is secured to the axle spindle for preloading the bearing assembly and securing the wheel hub and the axle spindle together for rotation with one another. As a result of separating the wheel hub to axle spindle pilot, provided by the inner annular wheel hub surface being piloted and supported on the outer annular wheel hub of the axle spindle, from the axle spindle to hub connection, provided by the mating connection of the internal axle spindle splines and the external wheel hub splines, the radial loads transmitted from the wheel hub to the axle spindle are separated from the torsional loads transmitted from the wheel hub splines to the axle spindle splines thereby reducing wear of the associated splines. Also, this separation is effective to reduce the radial loads transmitted from the wheel hub to the threaded fastener. Thus, the retention of the threaded fastener on the axle spindle is improved which in turn, is effective to maintain the bearing preload.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
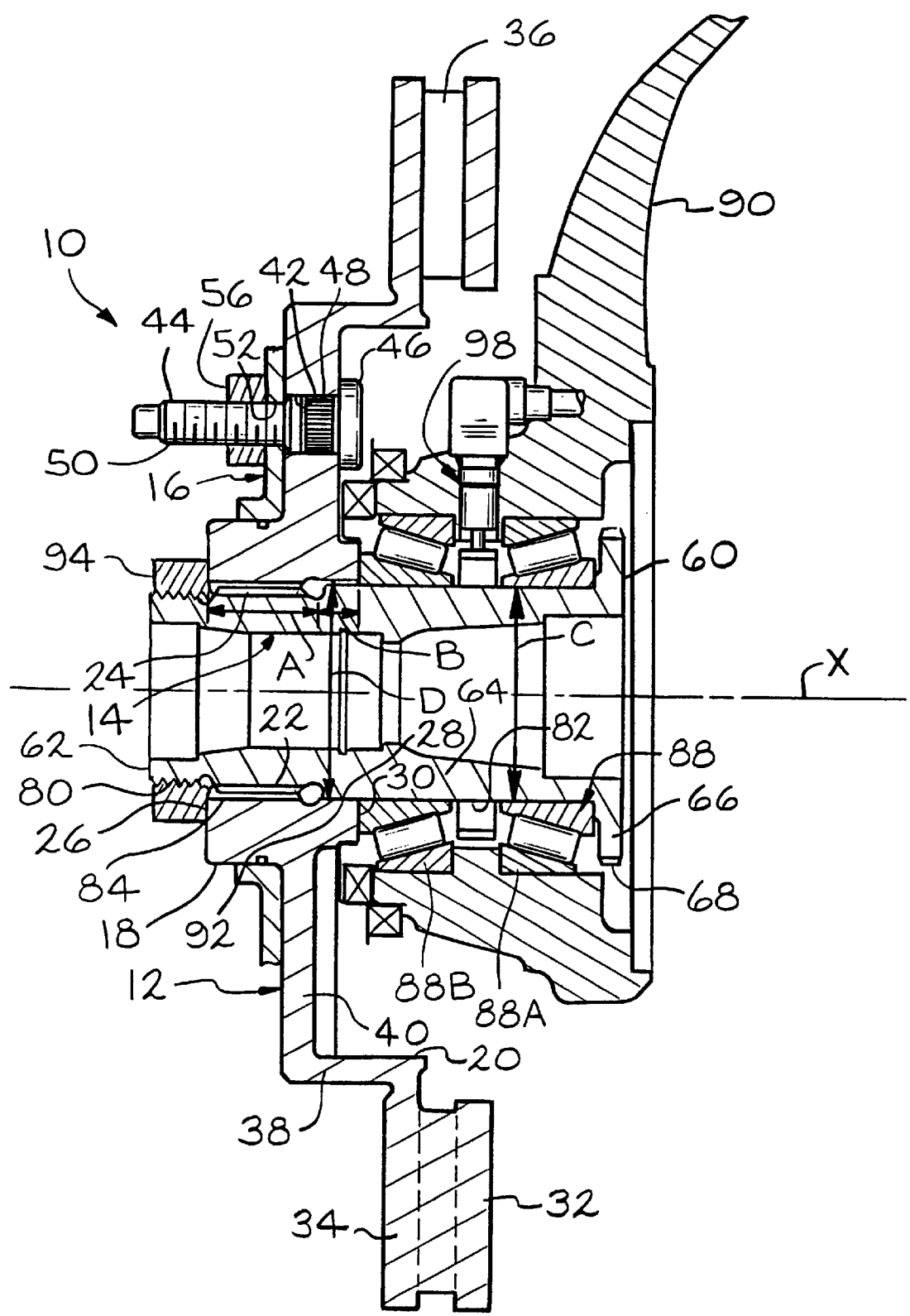
FIG. 1 is a sectional view of a portion of a first embodiment of an improved vehicle wheel hub mounting system in accordance with this invention.

Referring now to the drawings, there is illustrated in FIG. 1 a portion of a first embodiment of a vehicle wheel hub mounting system, indicated generally at 10, in accordance with this invention. The illustrated vehicle wheel hub mounting system 10 is associated with a front wheel of a vehicle. The general structure and operation of the vehicle wheel hub mounting system 10 is conventional in the art. Thus, only those portions of the vehicle wheel hub mounting system 10 which are necessary for a full understanding of this invention will be explained and illustrated in detail. Although this invention will be described and illustrated in connection with the particular vehicle wheel hub and brake rotor assemblies disclosed herein, it will be appreciated that this invention may be used in connection with other vehicle wheel hub assemblies and/or other vehicle brake assemblies.

The vehicle wheel hub mounting system 10 includes an integral wheel hub and brake rotor 12, an axle spindle or drive shaft 14, and a wheel 16. The integral wheel hub and brake rotor 12 defines an axis X and includes a wheel hub 18 and a brake rotor 20. The wheel hub 18 includes a centrally located internal bore 22, an opened outboard end 26, and an opened inboard end 30. The internal bore 22 is provided with internal splines 24 adjacent the outboard end 26 thereof, and with an inner annular wheel hub surface 28 adjacent the inboard end 30 thereof. The internal splines 24 extend from the outboard end 26 toward the inboard end 30 a predetermined axial distance A. The inner annular wheel hub surface 28 extends from the inboard end 30 toward the outboard end 26 a predetermined axial distance B which is less than the distance A, and defines a predetermined wheel hub inner diameter D. Alternatively, the distance B can be greater than or generally equal to the distance A. As will be discussed, the wheel hub internal splines 24 are operative to connect the wheel hub 18 to the axle spindle 14 for rotation therewith, and the inner annular wheel hub surface 28 is operative to pilot and support the wheel hub 18 on the axle spindle 14.

The brake rotor 20 is ventilated and includes a pair of opposed friction plates 32 and 34 which are spaced apart from one another by a plurality of intermediate ribs or posts 36 in a well known manner. The friction plate 34 of the rotor 20 is connected by a circumferentially extending wall 38 to an inner mounting flange portion 40. The inner mounting flange portion 40 of the rotor 20 includes a plurality of stud receiving holes 42 (only one of such stud receiving holes 42 is shown in FIG. 1) equally spaced circumferentially on the rotor 20 about the internal bore 22.

A mounting stud 44 is provided to secure the integral brake rotor and wheel hub 12 and the wheel 16 together for rotation with one another. Each mounting stud 44 includes an enlarged inner head 46, an intermediate body portion 48 provided with serrations formed along a portion thereof, and an outer main body portion 50 provided with external threads. The mounting stud 44 extends through the hole 42 formed in the flange portion 40 of the integral wheel hub and brake rotor 12, and through a hole 52 provided in the wheel 16. The serrations of the intermediate body portion 48 of the mounting stud 44 frictionally engage a side wall of the stud receiving hole 42 to secure the stud 44 to the mounting flange portion 40 of the integral wheel hub and brake rotor 12. A nut 56 is installed on the threaded outer end 50 of the mounting stud 44 to thereby secure the wheel 16 to the integral wheel hub and brake rotor 12 for rotation with one another.

The axle spindle 14 is a hollow shaft and includes an opened inboard end 60, an opened outboard end 62, and a generally axially extending main body 64. The inboard end 60 of the axle spindle 14 includes a generally radially outwardly extending flange 66. In the illustrated embodiment, the flange 66 includes a splined outer end 68 which is adapted to be selectively coupled to splines (not shown) provided on a half-shaft (not shown) by a selectable shift-lock mechanism (not shown). The half-shaft is rotatably supported relative to the axle spindle 14 and is adapted to be rotatably connected to an axle shaft (not shown) for rotation therewith during 4×4 wheel driving applications. The shift-lock mechanism is adapted to be secured to a non-rotatable vehicle component, such as a steering knuckle 90, by suitable means.

The axle spindle 14 is provided with an external threaded outer end portion 80 adjacent the outboard end 62 thereof, and a bearing seat 82 adjacent the inboard end 60 thereof. The axle spindle 14 further includes an external splined portion 84 adjacent the external threaded outer end portion 80, and an outer annular axle spindle surface 92 adjacent the bearing seat 82. The external splined portion 84 of the axle spindle 14 receives the internal splines 24 of the internal bore 22 of the wheel hub 18 in a mating connection therewith to rotatably connect the wheel hub 18 to the axle spindle 14 for rotation therewith. The outer annular axle spindle surface 92 defines a predetermined axle spindle outer diameter C.

A bearing assembly 88 is pressed onto the bearing seat 82 of the axle spindle 14. In the illustrated embodiment, the bearing assembly 88 includes an single row tapered inboard roller bearing 88A and a single row tapered outboard roller bearing 88B. However, the bearing assembly 88 can be other than illustrated if desired. For example, the bearing assembly 88 can be a pregreased, sealed-for-life cartridge type bearing assembly (not shown).

The inner wheel hub surface 28 is disposed about and piloted on the outer axle spindle surface 92 of the body 64 of the axle spindle 14. Preferably, to accomplish this, the inner diameter D of the inner wheel hub surface 28 is slightly greater than the outer diameter C defined by the outer axle spindle surface 92 so as to provide a clearance-fit or slip-fit therewith, as shown in the upper portion of FIG. 1 (the clearance between the axle spindle surface 92 and the inner wheel hub surface 28 shown exaggerated for clarity). Alternatively, the inner diameter D of the inner wheel hub surface 28 can be slightly less than or equal to the outer diameter C of the outer axle spindle surface 92 so as to provide a press-fit therewith, as shown in the lower portion of FIG. 1. Also, as shown in this embodiment, the outer diameter C of the outer axle spindle surface 92 of the axle spindle 14 is generally the same diameter as an outer diameter defined by the bearing seat 82. Alternatively, the outer diameter C of the outer axle spindle surface 92 can be greater than or less than the outer diameter of the bearing seat 82.

A spindle nut 94 is installed on the external threaded outer end portion 80 of the axle spindle 14 to secure the integral wheel hub and brake rotor 12 and the bearing assembly 88 to the axle spindle 14 for rotation therewith. Also, because the bearing assembly 88 is disposed between the flange 66 of the axle spindle 14 and the inboard end 30 of the wheel hub 18, the spindle nut 94 is effective to preload the bearing assembly 88 during tightening of the nut 94 against the outboard end 26 of the wheel hub 18 to a predetermined load. A cover and/or nut retainer (not shown) can be disposed over the nut 94 and secured to the assembly 10 by suitable means to prevent water, dirt, and other debris from entering therein. In the illustrated embodiment, the wheel hub and brake assembly 10 also includes a vehicle wheel speed sensor and tone wheel assembly 98.

The structure of the vehicle wheel hub mounting system 10 is effective to separate the wheel hub to axle spindle pilot, provided by the inner wheel hub surface 28 being piloted and supported on the outer axle spindle surface 92, from the axle spindle to hub connection, provided by the mating connection of the axle spindle splines 84 and the wheel hub splines 24. As a result, the radial loads transmitted from the wheel hub surface 28 to the axle spindle surface 92 are separated from the torsional loads transmitted from the wheel hub splines 24 to the axle spindle splines 84 thereby reducing wear of the associated splines. Also, this separation is effective to reduce the radial loads transmitted from the wheel hub 18 to the spindle nut 94. Thus, the retention of the spindle nut 94 on the axle spindle 18 is improved which in turn, is effective to maintain the bearing preload.

Figure 2:
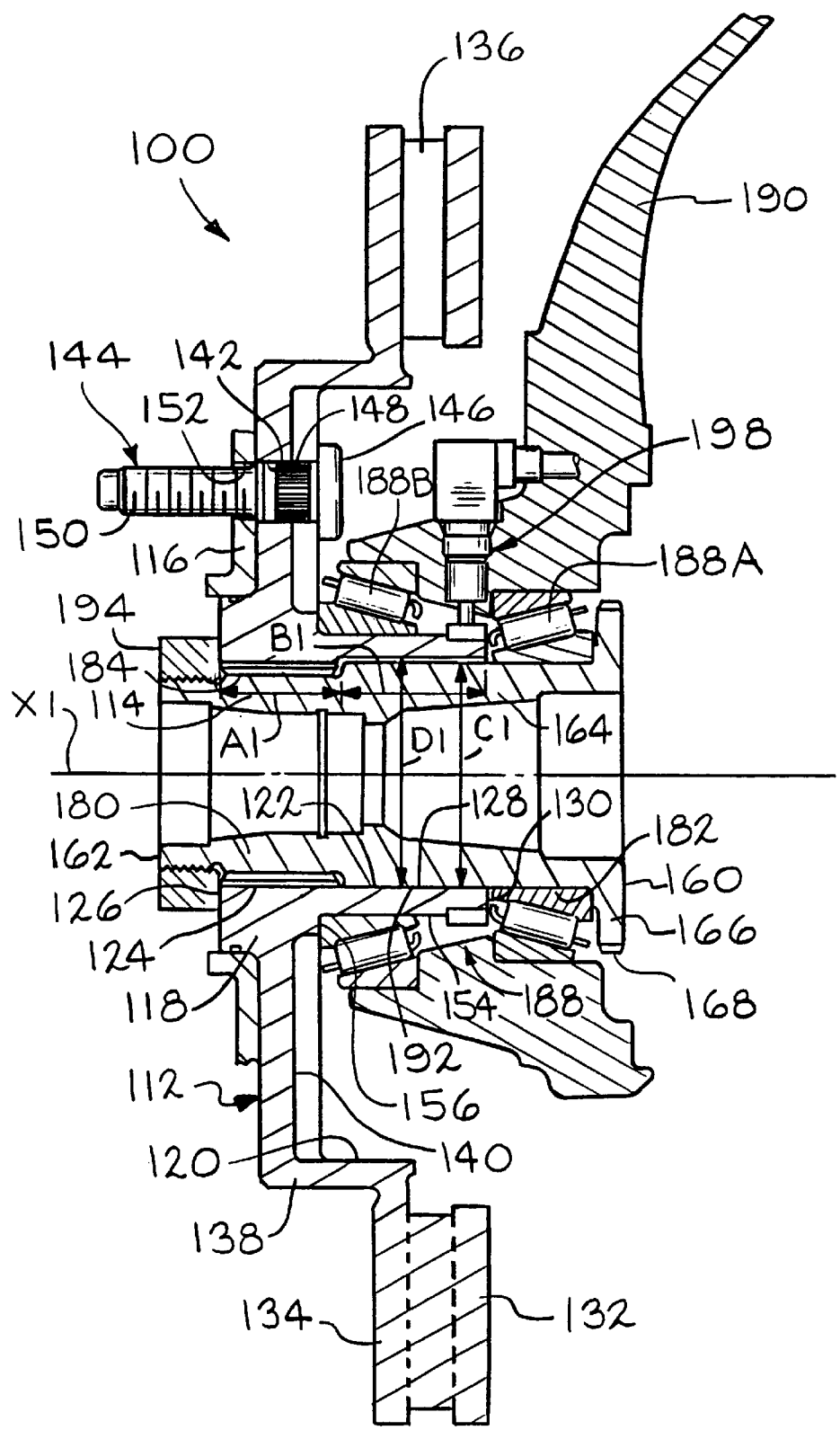
FIG. 2 is a sectional view of a portion of a second embodiment of an improved vehicle wheel hub mounting system in accordance with this invention.

FIG. 2 illustrates a second embodiment of a vehicle wheel hub mounting system, indicated generally at 100, in accordance with this invention. The illustrated vehicle wheel hub mounting system 100 is associated with a front wheel of a vehicle. The vehicle wheel hub mounting system 100 includes an integral wheel hub and brake rotor 112, an axle spindle 114, and a wheel 116. The integral wheel hub and brake rotor 112 defines an axis X1 and includes a wheel hub 118 and a brake rotor 120.

The wheel hub 118 includes a centrally located internal bore 122, an opened outboard end 126, and an opened inboard end 130. The internal bore 122 is provided with internal splines 124 adjacent the outboard end 126 thereof, and with an inner annular wheel hub surface 128 adjacent the inboard end 130 thereof. The internal splines 124 extend from the outboard end 126 toward the inboard end 130 a predetermined axial distance A1. The inner annular wheel hub surface 128 extends from the inboard end 130 toward the outboard end 126 a predetermined axial distance B1 which is greater than the distance A1, and defines a predetermined wheel hub inner diameter D1. Alternatively, the distance B1 can be less than or generally equal to the distance A1. As will be discussed, the wheel hub internal splines 124 are operative to connect the wheel hub 118 to the axle spindle 114 for rotation therewith, and the inner wheel hub surface 128 is operative to pilot and support the wheel hub 118 on the axle spindle 114. Also, the wheel hub 118 includes an outer annular surface 154 which defines an outboard bearing seat.

The brake rotor 120 is ventilated and includes a pair of opposed friction plates 132 and 134 which are spaced apart from one another by a plurality of intermediate ribs or posts 136 in a well known manner. The friction plate 134 of the rotor 120 is connected by a circumferentially extending wall 138 to an inner mounting flange portion 140. The inner mounting flange portion 140 of the rotor 120 includes a plurality of stud receiving holes 142 (only one of such stud receiving holes 142 is shown in FIG. 2) equally spaced circumferentially on the rotor 120 about the internal bore 122.

A mounting stud 144 is provided to secure the integral brake rotor and wheel hub 112 and the wheel 116 together for rotation with one another. Each mounting stud 144 includes an enlarged inner head 146, an intermediate body portion 148 provided with serrations formed along a portion thereof, and an outer main body portion 150 provided with external threads. The mounting stud 144 extends through the hole 142 formed in the flange portion 140 of the integral wheel hub and brake rotor 112, and through a hole 152 provided in the wheel 116. The serrations of the intermediate body portion 148 of the mounting stud 144 frictionally engage a side wall of the stud receiving hole 142 to secure the stud 144 to the mounting flange portion 140 of the integral wheel hub and brake rotor 112. A nut (not shown) is installed on the threaded outer end 150 of the mounting stud 144 to thereby secure the wheel 116 to the integral wheel hub and brake rotor 112 for rotation with one another.

The axle spindle 114 is a hollow shaft and includes an opened inboard end 160, an opened outboard end 162, and a generally axially extending main body 164. The inboard end 160 of the axle spindle 114 includes a generally radially outwardly extending flange 166. In the illustrated embodiment, the flange 166 includes a splined outer end 168 which is adapted to be selectively coupled to splines (not shown) provided on a half-shaft (not shown) by a selectable shift-lock mechanism (not shown). The half-shaft is rotatably supported relative to the axle spindle 114 and is adapted to be rotatably connected to an axle shaft (not shown) for rotation therewith during 4×4 wheel driving applications. The shift-lock mechanism is adapted to be secured to a non-rotatable vehicle component, such as a steering knuckle 190, by suitable means.

The axle spindle 114 is provided with an external threaded outer end portion 180 adjacent the outboard end 162 thereof, and a bearing seat 182 adjacent the inboard end 160 thereof. The axle spindle 114 further includes an external splined portion 184 adjacent the external threaded outer end portion 180, and an outer annular axle spindle surface 192 adjacent the inboard bearing seat 182. The external splined portion 184 of the axle spindle 114 receives the internal splines 124 of the internal bore 122 of the wheel hub 118 in a mating connection therewith to rotatably connect the wheel hub 118 to the axle spindle 114 for rotation therewith. The outer annular axle spindle surface 192 defines a predetermined axle spindle outer diameter C1.

A bearing assembly 188 is provided for rotatably supporting the wheel hub and brake rotor 112, the axle spindle 114, and the wheel 116 relative to the steering knuckle 190. In the illustrated embodiment, the bearing assembly 188 includes an single row tapered inboard roller bearing 188A and an single row tapered outboard roller bearing 188B. However, the bearing assembly 188 can be other than illustrated if desired. The inboard bearing 188A is pressed onto the bearing seat 182 of the axle spindle 114, and the outboard bearing 188B is pressed onto the bearing seat 154 of the wheel hub 118.

The inner annular wheel hub surface 128 is disposed about and piloted on the outer annular axle spindle surface 192 of the body 164 of the axle spindle 14. Preferably, to accomplish this, the inner diameter D1 of the inner wheel hub surface 128 is slightly greater than the outer diameter C1 defined by the outer axle spindle surface 192 so as to provide a clearance-fit therewith, as shown in the upper portion of FIG. 2 (the clearance between the axle spindle surface 192 and the inner wheel hub surface 128 shown exaggerated for clarity). Alternatively, the inner diameter D1 of the inner wheel hub surface 128 can be slightly less than or generally equal to the outer diameter C1 of the outer axle spindle surface 192 so as to provide a press-fit therewith, as shown in the lower portion of FIG. 2. Also, as shown in this embodiment, the outer diameter C1 of the outer axle spindle surface 192 of the axle spindle 114 is generally the same as an outer diameter defined by the bearing seat 182. Alternatively, the outer diameter C1 of the outer axle spindle surface 192 can be greater than or less than the outer diameter of the bearing seat 182.

A spindle nut 194 is installed on the external threaded outer end portion 180 of the axle spindle 114 to secure the integral wheel hub and brake rotor 112 to the axle spindle 114 for rotation therewith. Also, because the bearing assembly 188 is disposed between the flange 166 of the axle spindle 114 and an intermediate shoulder 156 of the wheel hub 118, the spindle nut 194 is effective to preload the bearing assembly 188 during tightening of the nut 194 against the outboard end 126 of the wheel hub 118 to a predetermined force. A cover and/or nut retainer (not shown) can be disposed over the nut 194 and secured to the assembly 100 by suitable means. In the illustrated embodiment. the wheel hub and brake assembly 100 also includes a vehicle wheel speed sensor and tone wheel assembly 198.

The structure of the vehicle wheel hub mounting system 100 is effective to separate the wheel hub to axle spindle pilot, provided by the inner wheel hub surface 128 being piloted and supported on the outer axle spindle surface 192, from the axle spindle to hub connection, provided by the mating connection of the axle spindle splines 184 and the wheel hub splines 124. Also, the structure of the vehicle wheel hub mounting system 100 supports the outboard bearing 188B on the bearing seat 154 of the wheel hub 118. As a result, the radial and bending loads transmitted from the wheel hub surface 128 to the axle spindle surface 192 are separated from the torsional loads transmitted from the wheel hub splines 124 to the axle splines 184 thereby reducing wear of the associated splines. Also, the wheel hub 118 is effective to transmit the radial loads to the outboard bearing 188B. Thus, the radial and bending loads transmitted to the spindle nut 194 are reduced. Thus, the retention of the spindle nut 194 on the axle spindle 118 is improved which in turn, is effective to maintain the bearing preload.

Figure 3:
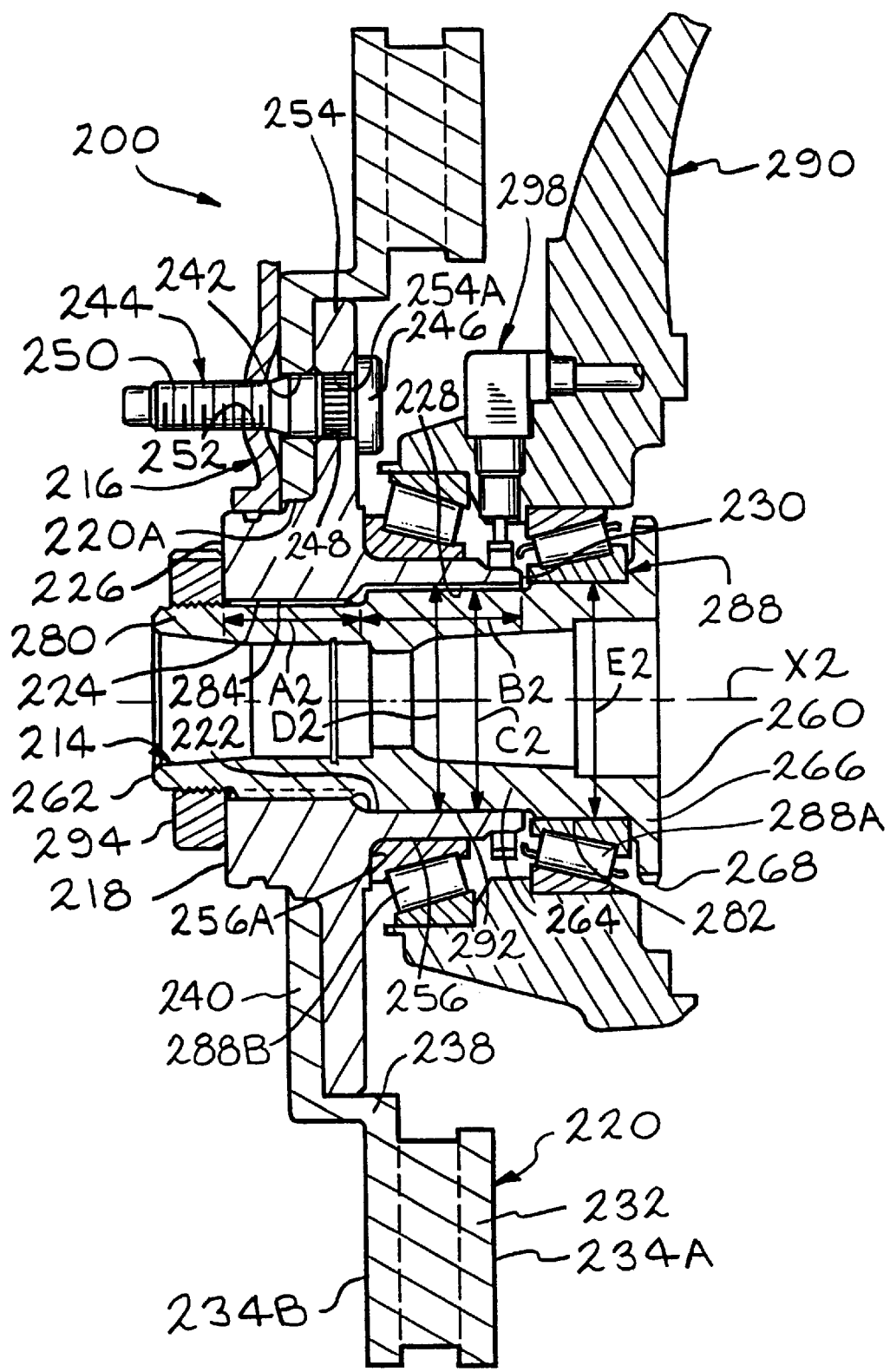
FIG. 3 is a sectional view of a portion of a third embodiment of an improved vehicle wheel hub mounting system in accordance with this invention.

FIG. 3 illustrates a third embodiment of a vehicle wheel hub mounting system, indicated generally at 200, in accordance with this invention. The illustrated vehicle wheel hub mounting system 200 is associated with a front wheel of a vehicle. The vehicle wheel hub mounting system 200 includes an axle spindle 214, a wheel 216, a wheel hub 218, and a brake rotor 220.

The wheel hub 218 defines an axis X2 and includes a centrally located internal bore 222. The internal bore 222 has a stepped configuration and includes an opened outboard end 226 and an opened inboard end 230. The internal bore 222 is provided with internal splines 124 adjacent the outboard end 226 thereof, and with an inner annular wheel hub surface 228 adjacent the inboard end 230 thereof. The internal splines 224 extend from the outboard end 226 toward the inboard end 230 a predetermined axial distance A2. The inner annular wheel hub surface 228 extends from the inboard end 230 toward the outboard end 226 a predetermined axial distance B2 which is greater than the distance A2, and defines a predetermined wheel hub inner diameter D2. Alternatively, the distance B2 can be less than or generally equal to the distance A2. As will be discussed, the wheel hub internal splines 224 are operative to connect the wheel hub 218 to the axle spindle 214 for rotation therewith, and the inner wheel hub surface 228 is operative to pilot and support the wheel hub 218 on the axle spindle 214.

The wheel hub 218 further includes a radially outwardly extending flange 254. The flange 254 includes a plurality of stud receiving holes 254A (only one of such stud receiving holes 254A is shown in FIG. 3) equally spaced circumferentially on the flange 254 about the internal bore 222. Also, the wheel hub 218 includes an outer annular surface 256 which defines an outboard bearing seat.

In the illustrated embodiment, the brake rotor 220 is solid and includes an outer annular portion 232 having a pair of opposed friction surfaces 234A and 234B which are spaced apart from one another in a generally parallel relationship. The outer annular portion 232 of the rotor 220 is connected by a circumferentially extending wall 238 to an inner mounting flange portion 240. The inner mounting flange portion 240 of the rotor 220 includes a centrally located pilot hole 220A and a plurality of stud receiving holes 242 (only one of such stud receiving holes 242 is shown in FIG. 3) equally spaced circumferentially on the rotor 220 about the pilot hole 220A.

A mounting stud 244 is provided to secure the brake rotor 220, the wheel hub 218, and the wheel 216 together for rotation with one another. Each mounting stud 244 includes an enlarged inner head 246, an intermediate body portion 248 provided with serrations formed along a portion thereof, and an outer main body portion 250 provided with external threads. The mounting stud 244 extends through the hole 254A formed in the flange 254 of the hub 118, through the hole 242 formed in the mounting flange portion 240 of the brake rotor 220, and through a hole 252 provided in the wheel 216. The serrations of the intermediate body portion 248 of the mounting stud 244 frictionally engage a side wall of the stud receiving hole 254A to secure the stud 244 to the flange 254 of the wheel hub 218. A nut (not shown) is installed on the threaded outer end 250 of the mounting stud 244 to thereby secure the wheel 216, the brake rotor 220, and the wheel hub 218 together for rotation with one another.

The axle spindle 214 is a hollow shaft and includes an opened inboard end 260, an opened outboard end 262, and a generally axially extending main body 264. The inboard end 260 of the axle spindle 214 includes a generally radially outwardly extending flange 266. In the illustrated embodiment, the flange 266 includes a splined outer end 268 which is adapted to be selectively coupled to splines (not shown) provided on a half-shaft (not shown) by a selectable shift-lock mechanism (not shown). The half-shaft is rotatably supported relative to the axle spindle 214 and is adapted to be rotatably connected to an axle shaft (not shown) for rotation therewith during 4×4 wheel driving applications. The shift-lock mechanism is adapted to be secured to a non-rotatable vehicle component, such as a steering knuckle 290, bad suitable means.

The axle spindle 214 is provided with an external threaded outer end portion 280 adjacent the outboard end 262 thereof, and an inboard bearing seat 282 adjacent the inboard end 260 thereof. The axle spindle 214 further includes an external splined portion 284 adjacent the external threaded outer end portion 280, and an outer annular axle spindle surface 292 adjacent the inboard bearing, seat 282. The intermediate external splined portion 284 of the axle spindle 214 receives the internal splines 224 of the internal bore 222 of the wheel hub 218 in a mating connection therewith to rotatably connect the wheel hub 218 to the axle spindle 214 for rotation therewith. The outer annular axle spindle surface 292 defines a predetermined axle spindle outer diameter C2.

A bearing assembly 288 is provided for rotatably supporting the wheel 216, the hub 218, and the brake rotor 220 relative to the steering knuckle 290. In the illustrated embodiment, the bearing assembly 288 includes an single row tapered inboard roller bearing 288A and an single row tapered outboard roller bearing 288B. However, the bearing assembly 288 can be other than illustrated if desired. The inboard bearing 288A is pressed onto the inboard bearing seat 282 of the axle spindle 214, and the outboard bearing 288B is pressed onto the outboard bearing seat 256 of the wheel hub 218.

The inner annular wheel hub surface 228 is disposed about and piloted on the outer annular axle spindle surface 292 of the body 264 of the axle spindle 214. Preferably, to accomplish this, the inner diameter D2 defined by the inner wheel hub surface 228 is slightly greater than the outer diameter C2 defined by the outer surface 292 so as to provide a clearance-fit therewith, as shown in the upper portion of FIG. 3 (the clearance between the outer axle spindle surface 292 and the inner wheel hub surface 228 shown exaggerated for clarity). Alternatively, the inner diameter D2 of the inner wheel hub surface 228 can be slightly less than or generally equal to the outer diameter C2 of the outer axle spindle surface 292 so as to provide a press-fit therewith, as shown in the lower portion of FIG. 3. Also, as shown in this embodiment, the outer diameter C2 of the outer axle spindle surface 292 of the axle spindle 214 is less than an outer diameter E2 defined by the outer bearing seat 282. Alternatively, the outer diameter C2 of the outer axle spindle surface 292 can be greater than or equal to the outer diameter E2 of the outer bearing seat 282.

A spindle nut 294 is installed on the external threaded outer end portion 280 of the axle spindle 214 to secure the wheel hub 218, the brake rotor 220, and the wheel 216 to the axle spindle 214 for rotation therewith. Also, because the bearing assembly 288 is disposed between the flange 266 of the axle spindle 214 and an intermediate shoulder 256A of the wheel hub 218, the spindle nut 294 is effective to preload the bearing assembly 288 during tightening of the nut 294 against the outboard end 226 of the wheel hub 218 to a predetermined force. A suitable means (not shown), can be used to prevent rotation, i.e., loosening, of the nut 294 so as to maintain the bearing preload. A cover and/or nut retainer (not shown) can be disposed over the nut 294 and secured to the assembly 200 by suitable means. The wheel hub and brake assembly 200 also includes a vehicle wheel speed sensor and tone wheel assembly 298.

The structure of the vehicle wheel hub mounting system 200 is effective to separate the wheel hub to axle spindle pilot, provided by the inner wheel hub surface 228 being piloted and supported on the outer axle spindle surface 292, from the axle spindle to hub connection, provided by the mating connection of the axle spindle splines 284 and the wheel hub splines 224. Also, the structure of the vehicle wheel hub mounting system 200 supports the outboard bearing 288B on the bearing seat 256 of the wheel hub 218. As a result, the radial and bending loads transmitted from the wheel hub surface 228 to the axle spindle surface 292 are separated from the torsional loads transmitted from the wheel hub splines 224 to the axle splines 284 thereby reducing wear of the associated splines. Also, the wheel hub 218 is effective to transmit the radial loads to the outboard bearing 288B. Thus, the radial and bending loads transmitted to the spindle nut 294 are reduced. As a result, the retention of the spindle nut 294 on the axle spindle 218 is improved which in turn, is effective to maintain the bearing preload.

Figure 4:
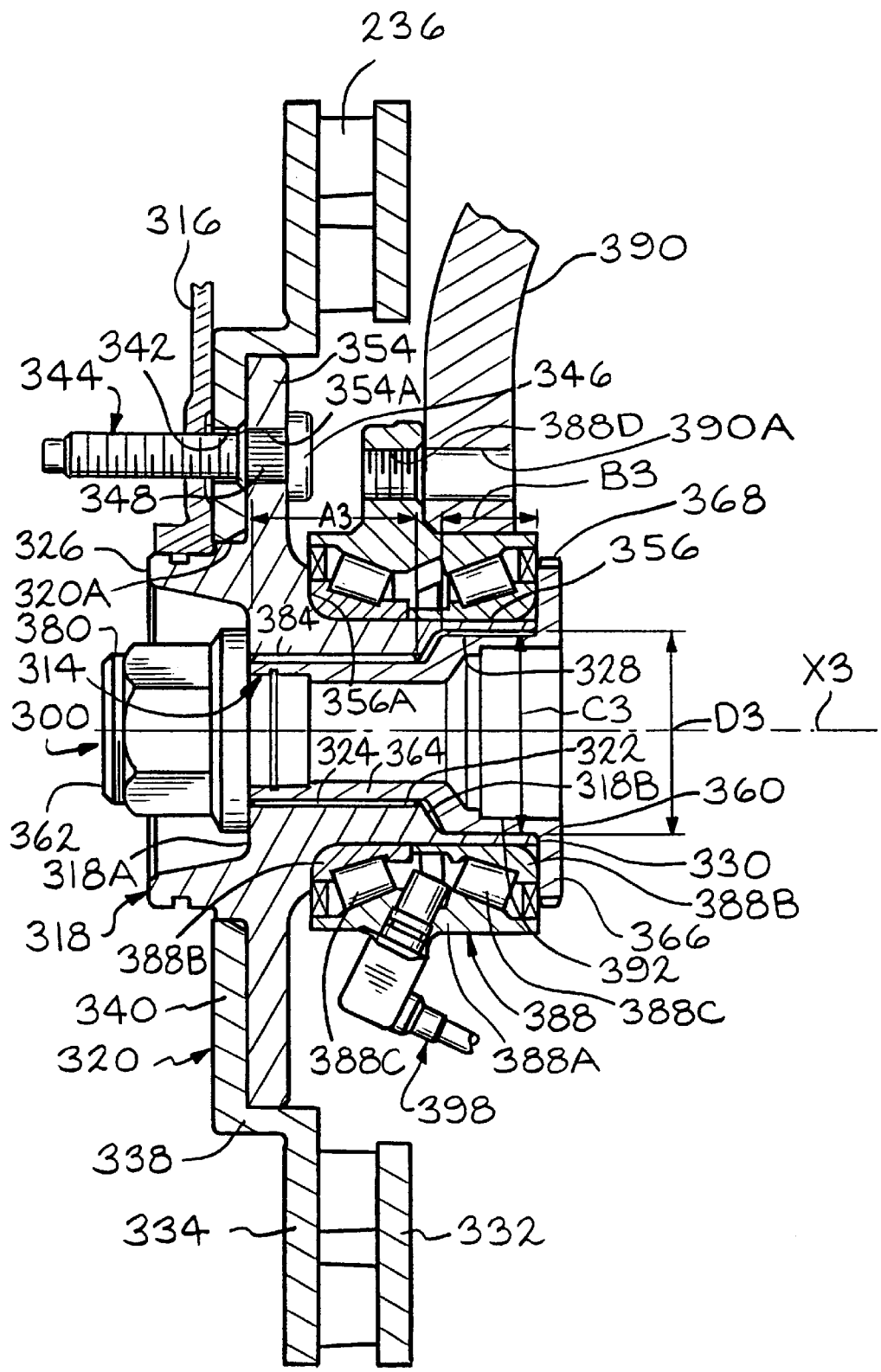
FIG. 4 is a sectional view of a portion of a fourth embodiment of an improved vehicle wheel hub mounting system in accordance with this invention.

FIG. 4 illustrates a fourth embodiment of a vehicle wheel hub mounting system, indicated generally at 300, in accordance with this invention. The illustrated vehicle wheel hub mounting system 300 is associated with a front wheel of a vehicle. The vehicle wheel hub mounting system 300 includes an axle spindle 314, a wheel 316, a wheel hub 318, and a brake rotor 320.

The wheel hub 318 defines an axis X3 and includes a centrally located internal bore 322. The internal bore 322 has a stepped configuration and includes an opened outboard end 326 and opened inboard end 330. The internal bore 322 is provided with internal splines 324 adjacent the outboard end 326 thereof, and with an inner annular wheel hub surface 328 adjacent the inboard end 330 thereof. The internal splines 324 extend from an outer wheel hub shoulder 318A toward the inboard end 330 a predetermined axial distance A3. The inner annular wheel hub surface 328 extends from the inboard end 330 toward the outboard end 326 a predetermined axial distance B3 which is less than the distance A3, and defines a predetermined wheel hub inner diameter D3. Alternatively, the distance B3 can be greater than or generally equal to the distance A3. As will be discussed, the wheel hub internal splines 324 are operative to connect the wheel hub 318 to the axle spindle 314 for rotation therewith. An inner wheel hub shoulder or step 318B is defined at the transition from the internal splines 324 to the inner wheel hub surface 328.

The wheel hub 318 further includes a radially outwardly extending flange 354. The flange 354 includes a plurality of stud receiving holes 354A (only one of such stud receiving holes 354A is shown in FIG. 4) equally spaced circumferentially on the flange 354 about the internal bore 322. Also, the wheel hub 318 includes an outer annular surface 356 which defines a bearing seat.

In the illustrated embodiment, the brake rotor 320 is ventilated and includes a pair of opposed friction plates 332 and 334 which are spaced apart from one another by a plurality of intermediate ribs 336 in a well known manner. The friction plate 334 of the rotor 320 is connected by a circumferentially extending wall 338 to an inner mounting flange portion 340. The inner mounting flange portion 340 of the rotor 320 includes a centrally located pilot hole 320A and a plurality of stud receiving holes 342. (only one of such stud receiving holes 342 is shown in FIG. 4) equally spaced circumferentially on the rotor 320 about the pilot hole 320A.

A mounting stud 344 is provided to secure the brake rotor 320, the wheel hub 318, and the wheel 316 together for rotation with one another. Each mounting stud 344 includes an enlarged inner head 346, an intermediate body portion 348 provided with serrations formed along a portion thereof, and an outer main body portion 350 provided with external threads. The mounting stud 344 extends through the hole 354A formed in the flange 354 of the hub 318, through the hole 342 formed in the mounting flange portion 340 of the brake rotor 320, and through a hole 352 provided in the wheel 316. The serrations of the intermediate body portion 348 of the mounting stud 344 frictionally engage a side wall of the stud receiving hole 354A to secure the stud 344 to the flange 354 of the wheel hub 318. A nut (not shown) is installed on the threaded outer end 350 of the mounting stud 344 to thereby secure the wheel 316, the brake rotor 320, and the wheel hub 318 together for rotation with one another.

The axle spindle 314 is a hollow shaft and includes an opened inboard end 360, an opened outboard end 362, and a generally axially extending main body 364. The inboard end 360 of the axle spindle 314 includes a generally radially outwardly extending flange 366. In the illustrated embodiment, the flange 366 includes a splined outer end 368 which is adapted to be selectively coupled to splines (not shown) provided on a half-shaft (not shown) by a selectable shift-lock mechanism (not shown). The half-shaft is rotatably supported relative to the axle spindle 314 and is adapted to be rotatably connected to an axle shaft (not shown) for rotation therewith during 4×4 wheel driving applications. The shift-lock mechanism is adapted to be secured to a non-rotatable vehicle component, such as a steering knuckle 390, by suitable means.

The axle spindle 314 is provided with an external threaded outer end portion 380 adjacent the outboard end 362 thereof, and an outer annular axle spindle surface 392 adjacent the inboard end 360 thereof. The axle spindle 314 further includes an external splined portion 384 adjacent the threaded outer end portion 380. The external splined portion 384 of the axle spindle 314 receives the internal splines 324 of the internal bore 322 of the wheel hub 318 in a mating connection therewith to rotatably connect the wheel hub 318 to the axle spindle 314 for rotation therewith. The outer annular axle spindle surface 392 defines a predetermined axle spindle outer diameter C3.

A bearing assembly 388 is provided for rotatably supporting the wheel 316, the hub 318, and the brake rotor 320 relative to the steering knuckle 390. In the illustrated embodiment, the bearing assembly 388 is a pregreased, sealed-for-life cartridge type of bearing unit. The bearing unit 388 includes an outer race 388A, a pair of inner races 388B, and a pair of bearings 388C, shown in this embodiment as being a pair of tapered roller bearings, installed between the inner and outer races. However, the bearing assembly 388 can be other than illustrated if desired. The outer race 388A is secured to the steering knuckle 390 by a plurality of bolts and nuts (not shown) which extend through respective apertures 388D and 390A formed through the outer race 388A and the steering knuckle 390. The bearing unit 388 is pressed onto the bearing seat 356 of the wheel hub 318.

The inner annular wheel hub surface 328 is disposed about the outer annular axle spindle surface 392 of the body 364 of the axle spindle 314. Preferably, to accomplish this, the inner diameter D3 defined by the inner wheel hub surface 328 is slightly greater than the outer diameter C3 defined by the outer surface 392 so as to provide a clearance-fit therewith. Alternatively, the inner diameter D3 of the inner wheel hub surface 328 can be slightly less than or generally equal to the outer diameter C3 of the outer axle spindle surface 392 so as to provide a press-fit therewith.

A flanged spindle nut 394 is installed on the external threaded outer end portion 380 of the axle spindle 314 to secure the wheel hub 318 and, therefore the brake rotor 320 and the wheel 316, to the axle spindle 314 for rotation therewith. Also, because the bearing assembly 388 is disposed between the flange 366 of the axle spindle 314 and an intermediate shoulder 356A of the wheel hub 318, the spindle nut 394 is effective to preload the bearing assembly 388 during tightening of the nut 394 against the shoulder 318A of the wheel hub 318 to a predetermined force. A suitable means (not shown) can be provided to prevent loosening of the nut 394 relative to the axle spindle 314 so as to maintain the bearing preload. A cover and/or nut retainer (not shown) can be disposed over the nut 394 and secured to the assembly 100 by suitable means. The wheel hub and brake assembly 300 also includes a vehicle wheel speed sensor and tone wheel assembly 398.

The structure of the vehicle wheel hub mounting system 300 is effective to carry the wheel hub 318 on bearing assembly 388. As a result, the radial and bending loads are transmitted from the wheel hub 318 to the bearing assembly 388, and the torsional loads are transmitted from the axle spindle 314 to the wheel hub 318 thereby reducing wear of the respective splines 324 and 384. Also, the radial and bending loads transmitted to the spindle nut 394 are reduced.

Thus, the retention of the spindle nut 394 on the axle spindle 318 is improved which in turn, is effective to maintain the bearing preload.

Figure 5:
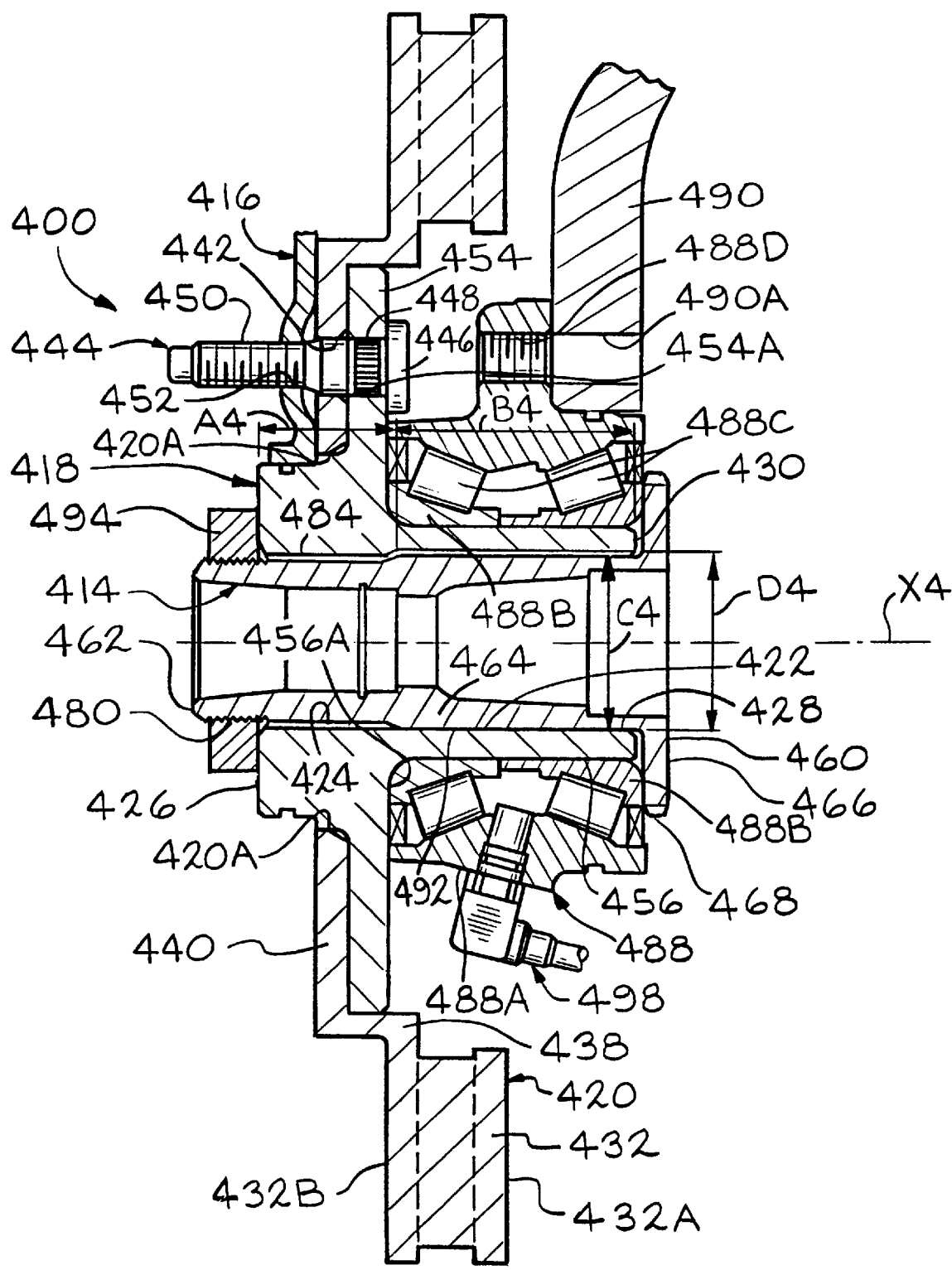
FIG. 5 is a sectional view of a portion of a fifth embodiment of an improved vehicle wheel hub mounting system in accordance with this invention.

FIG. 5 illustrates a fifth embodiment of a vehicle wheel hub mounting system, indicated generally at 400, in accordance with this invention. The illustrated vehicle wheel hub mounting system 400 is associated with a front wheel of a vehicle. The vehicle wheel hub mounting system 400 includes an axle spindle 414, a wheel 416, a wheel hub 418, and a brake rotor 420.

The wheel hub 418 defines an axis X4 and includes a centrally located internal bore 422. The internal bore 422 includes an opened outboard end 426 and an opened inboard end 430. The internal bore 422 is provided with internal splines 424 adjacent the outboard end 426 thereof, and with an inner annular wheel hub surface 428 adjacent the inboard end 430 thereof. The internal splines 424 extend from the outboard end 426 toward the inboard end 430 a predetermined axial distance A4. The inner annular wheel hub surface 428 extends from the inboard end 430 toward the outboard end 426 a predetermined axial distance B4 which is greater than the distance A4, and defines a predetermined wheel hub inner diameter D4. Alternatively, the distance B4 can be less than or generally equal to the distance A4. As will be discussed, the wheel hub internal splines 424 are operative to connect the wheel hub 418 to the axle spindle 414 for rotation therewith.

The wheel hub 418 further includes a radially outwardly extending flange 454. The flange 454 includes a plurality of stud receiving holes 454A (only one of such stud receiving holes 454A is shown in FIG. 5) equally spaced circumferentially on the flange 454 about the internal bore 422. Also, the wheel hub 418 includes an outer annular surface which defines a bearing seat 456.

The brake rotor 420 is solid and includes an outer annular portion 432 having a pair of opposed friction surfaces 434A and 434B which are spaced apart from one another in a generally parallel relationship. The outer annular portion 432 of the rotor 420 is connected by a circumferentially extending wall 438 to an inner mounting flange portion 440. The inner mounting flange portion 440 of the rotor 420 includes a centrally located pilot hole 420A and a plurality of stud receiving holes 442 (only one of such stud receiving holes 442 is shown in FIG. 5) equally spaced circumferentially on the rotor 420 about the pilot hole 420A.

A mounting stud 444 is provided to secure the brake rotor 420, the wheel hub 418, and the wheel 416 together for rotation with one another. Each mounting stud 444 includes an enlarged inner head 446, an intermediate body portion 448 provided with serrations formed along a portion thereof, and an outer main body portion 450 provided with external threads. The mounting stud 444 extends through the hole 454A formed in the flange 454 of the hub 418, through the hole 442 formed in the mounting flange portion 440 of the brake rotor 420, and through a hole 452 provided in the wheel 416. The serrations of the intermediate body portion 448 of the mounting stud 444 frictionally engage a side wall of the stud receiving hole 454A to secure the stud 444 to the flange 454 of the wheel hub 418. A nut (not shown) is installed on the threaded outer end 450 of the mounting stud 444 to thereby secure the wheel 416, the brake rotor 420, and the wheel hub 418 together for rotation with one another.

The axle spindle 414 is a hollow shaft and includes an opened inboard end 460, an opened outboard end 462, and a generally axially extending main body 464. The inboard end 460 of the axle spindle 414 includes a generally radially outwardly extending flange 466. In the illustrated embodiment, the flange 466 includes a splined outer end 468 which is adapted to be selectively coupled to splines (not shown) provided on a half-shaft (not shown) by a selectable shift-lock mechanism (not shown). The half-shaft is rotatably supported relative to the axle spindle 414 and is adapted to be rotatably connected to an axle shaft (not shown) for rotation therewith during 4×4 wheel driving applications. The shift-lock mechanism is adapted to be secured to a non-rotatable vehicle component, such as a steering knuckle 490, by suitable means.

The axle spindle 414 is provided with an external threaded outer end portion 480 adjacent the outboard end 462 thereof, and an outer annular axle spindle surface 492 adjacent the inboard end 460 thereof The axle spindle 414 further includes an external splined portion 484 adjacent the outer end portion 480. The intermediate external splined portion 484 of the axle spindle 414 receives the internal splines 424 of the internal bore 422 of the wheel hub 418 in a mating connection therewith to rotatably connect the wheel hub 418 to the axle spindle 414 for rotation therewith. The outer annular axle spindle surface 492 defines a predetermined axle spindle outer diameter C4.

A bearing assembly 488 is provided for rotatably supporting the wheel 416, the hub 418, and the brake rotor 420 relative to the steering knuckle 490. In the illustrated embodiment, the bearing assembly 488 is a pregreased, sealed-for-life cartridge type of bearing unit. The bearing unit 488 includes an outer race 488A, a pair of inner races 488B, and a pair of bearings 488C, shown in this embodiment as being a pair of tapered roller bearings, installed between the inner and outer races. However, the bearing assembly 488 can be other than illustrated if desired. The outer race 488A is secured to the steering knuckle 490 by a plurality of bolts and nuts (not shown) which extend through respective apertures 488D and 490A formed through the outer race 488A and the steering knuckle 490. The bearing unit 488 is pressed onto the bearing seat 456 of the wheel hub 418.

The inner annular wheel hub surface 428 is disposed about the outer annular axle spindle surface 492 of the body 464 of the axle spindle 414. Preferably, to accomplish this, the inner diameter D4 defined by the inner wheel hub surface 428 is slightly greater than the outer diameter C4 defined by the outer surface 492 so as to provide a clearance-fit therewith, as shown in the upper portion of FIG. 5 (the clearance between the outer axle spindle surface 492 and the inner wheel hub surface 428 shown exaggerated for clarity). Alternatively, the inner diameter D4 of the inner wheel hub surface 428 can be slightly less than or generally equal to the outer diameter C4 of the outer axle spindle surface 492 so as to provide a press-fit therewith, as shown in the lower portion of FIG. 5.

A spindle nut 494 is installed on the external threaded outer end portion 480 of the axle spindle 414 to secure the wheel hub 418, the brake rotor 420, and the wheel 416 to the axle spindle 414 for rotation therewith. Also, because the bearing assembly 488 is disposed between the flange 466 of the axle spindle 414 and a shoulder 456A of the wheel hub 418, the spindle nut 494 is effective to preload the bearing assembly 488 during tightening of the nut 494 against the outer end 426 of the wheel hub 418 to a predetermined load. A suitable means (not shown) can be used to prevent loosening of the spindle nut 494 so as to maintain the bearing preload. A cover and/or nut retainer (not shown) can be disposed over the nut 494 and secured to the assembly 400 by suitable means. In the illustrated embodiment, the wheel hub and brake assembly 400 also includes a vehicle wheel speed sensor and tone wheel assembly 498.

The structure of the vehicle wheel hub mounting system 400 is effective to carry the wheel hub 418 on the bearing assembly 488. As a result, the radial and bending loads are transmitted from the wheel hub 418 to the bearing assembly 488, and the torsional loads are transmitted from the axle spindle 414 to the wheel hub 418 thereby reducing wear of the respective splines 424 and 484. Also, the radial and bending loads transmitted to the spindle nut 494 are reduced. Thus, the retention of the spindle nut 494 on the axle spindle 418 is improved which in turn, is effective to maintain the bearing preload.

Figure 6:
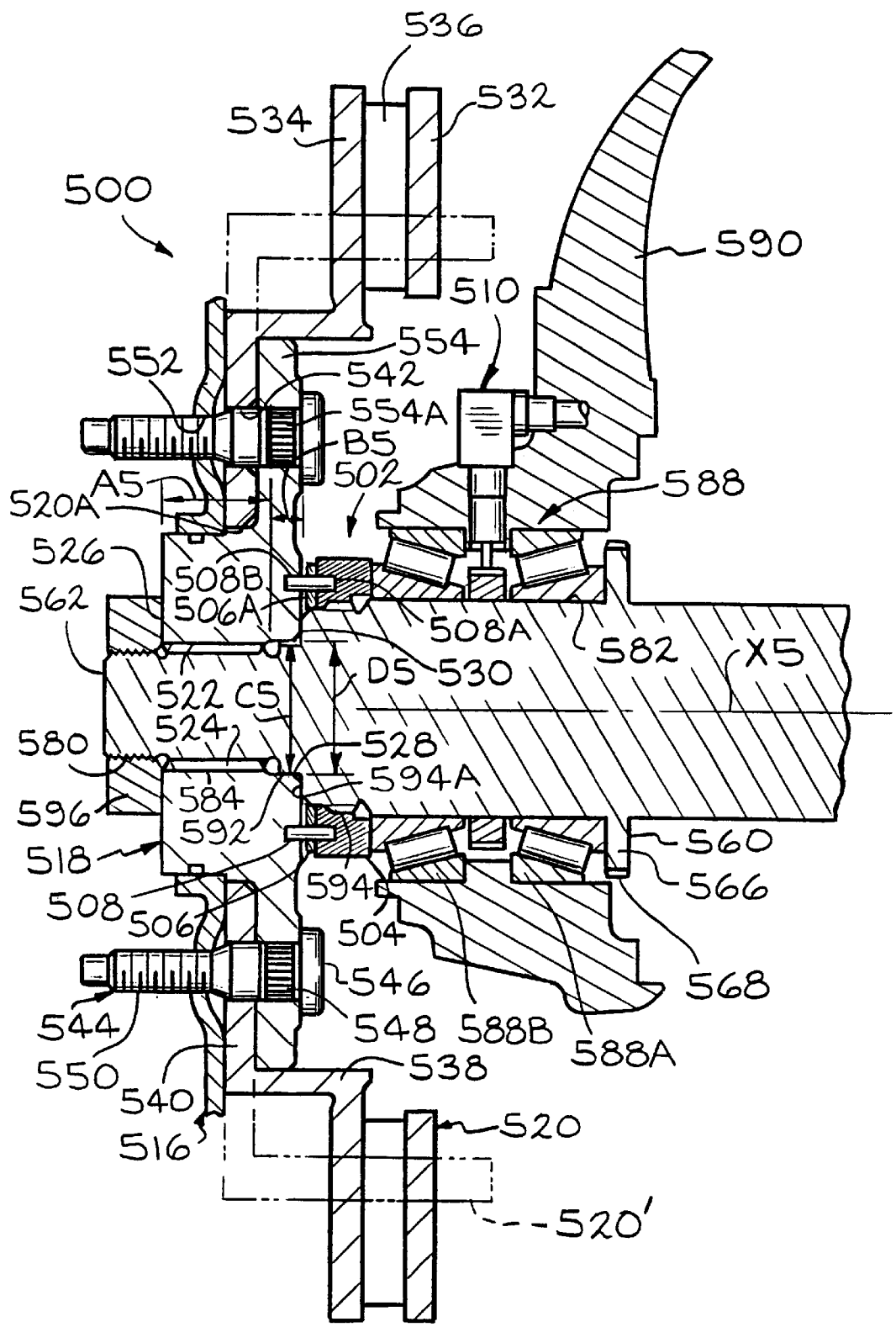
FIG. 6 is a sectional view of a portion of a sixth embodiment of an improved vehicle wheel hub mounting system in accordance with this invention.

FIG. 6 illustrates a sixth embodiment of a vehicle wheel hub mounting system, indicated generally at 500, in accordance with this invention. The illustrated vehicle wheel hub mounting system 500 is associated with a front wheel of a vehicle. The vehicle wheel hub mounting system 500 includes an axle spindle 514, a wheel 516, a wheel hub 518, and a brake rotor 520. Alternatively, the assembly 500 could include a brake drum 520' (shown in phantom) instead of the brake rotor 520 for use with a rear wheel of a vehicle.

The wheel hub 518 defines an axis X5 and includes a centrally located internal bore 522, an opened outboard end 526, and an opened inboard end 530. The internal bore 522 is provided with internal splines 524 adjacent the outboard end 526 thereof, and with an inner annular wheel hub surface 528 adjacent the inboard end 530 thereof. The internal splines 524 extend from the outboard end 526 toward the inboard end 530 a predetermined axial distance A5. The inner annular wheel hub surface 528 extends from the inboard end 530 toward the outboard end 526 a predetermined axial distance B5 which is less than the distance A5, and defines a predetermined wheel hub inner diameter D5. Alternatively, the distance B5 can be greater than or generally equal to the distance A5. As will be discussed, the wheel hub internal splines 524 are operative to connect the wheel hub 514 to the axle spindle 514 for rotation therewith, and the annular wheel hub inner surface 528 is operative to pilot and support the wheel hub 518 on the axle spindle 514.

The wheel hub 518 further includes a radially outwardly extending flange 554. The flange 554 includes a plurality of stud receiving holes 554A (only two one of such stud receiving holes 554A is shown in FIG. 6) equally spaced circumferentially on the flange 554 about the internal bore 522.

The brake rotor 520 is ventilated and includes a pair of opposed friction plates 532 and 534 which are spaced apart from one another by a plurality of intermediate ribs or posts 536 in a well known manner. The friction plate 534 of the rotor 520 is connected by a circumferentially extending wall 538 to an inner mounting flange portion 540. The inner mounting flange portion 540 of the rotor 520 includes a centrally located pilot hole 520A and a plurality of stud receiving holes 542 (only two of such stud receiving holes 542 is shown in FIG. 6) equally spaced circurmferentially on the rotor 520 about the pilot hole 520A.

A mounting stud 544 is provided to secure the brake rotor 520, the wheel hub 518, and the wheel 516 together for rotation with one another. Each mounting stud 544 includes an enlarged inner head 546, an intermediate body portion 548 provided with serrations formed along a portion thereof, and an outer main body portion 550 provided with external threads. The mounting stud 544 extends through the hole 554A formed in the flange portion 554 of the wheel hub 518, through the hole 542 formed in the mounting flange portion 540 of the brake rotor 520, and through a hole 552 provided in the wheel 516. The serrations of the intermediate body portion 548 of the mounting stud 544 frictionally engage a side wall of the stud receiving hole 554A to secure the stud 544 to the flange portion 554 of the wheel hub 518. A nut (not shown) is installed on the threaded outer end 550 of the mounting stud 544 to thereby secure the wheel 516, the wheel hub 518, and the brake rotor 520 together for rotation with one another.

The axle spindle 514 is a solid shaft and includes a closed inboard end (not shown), a closed outboard end 562, and a generally axially extending main body 564. The main body 564 of the axle spindle 514 includes a generally radially outwardly extending flange 566. The inboard end of the axle spindle 514 is adapted to be rotatably connected to an axle shaft (not shown) for rotation therewith during full time wheel driving applications. Alternatively, the structure of the axle spindle 514 can be other than illustrated if desired.

The main body 564 of the axle spindle 514 has a stepped configuration and is provided with an external threaded outer end portion 580, an external splined portion 584, an outer annular axle spindle surface 592, an external intermediate threaded portion 594, and a bearing seat 582. The external splined portion 584 of the axle spindle 514 receives the internal splines 524 of the internal bore 522 of the wheel hub 518 in a mating connection therewith to rotatably connect the wheel hub 518 to the axle spindle 514 for rotation therewith. The outer annular axle spindle surface 592 defines a predetermined axle spindle outer diameter C5.

A bearing assembly 588 is pressed onto the bearing seat 582 of the axle spindle 514. In the illustrated embodiment, the bearing assembly 588 includes an single row tapered inboard roller bearing 588A and a single row tapered outboard roller bearing 588B. However, the bearing assembly 588 can be other than illustrated if desired. For example, the bearing assembly 588 can be a pregreased, sealed-for-life cartridge type bearing assembly (not shown).

The wheel hub inner surface 528 is disposed about and piloted on the outer annular axle spindle surface 592 of the body 564 of the axle spindle 514. Preferably, to accomplish this, the inner diameter D5 of the inner wheel hub surface 528 is slightly greater than an outer diameter C5 defined by the outer axle spindle surface 592 so as to provide a clearance-fit or slip-fit therewith, as shown in the upper portion of FIG. 6 (the clearance between the outer axle spindle surface 592 and the inner wheel hub surface 528 shown exaggerated for clarity). Alternatively, the inner diameter D5 of the inner wheel hub surface 528 can be slightly less than or generally equal to the outer diameter C5 of the outer axle spindle surface 592 so as to provide a press-fit therewith, as shown in the lower portion of FIG. 6.

The vehicle wheel hub mounting system 500 further includes a bearing preload assembly, indicated generally at 502. The bearing preload assembly 502 includes an internal threaded nut 504, an annular ring 506, and a plurality of pins 508 (only two of such pins 508 are illustrated in FIG. 6). The nut 504 is threaded on the external threaded portion 594 of the axle spindle 514 and tightened against the outboard bearing 588A in order to clamp the bearing assembly 588 between the nut 504 and the flange 566 of the axle spindle 514. As a result, the nut 504 is operative to preload the bearing assembly 588 to a predetermined load.

The ring 506 and pins 508 are provided to prevent rotation of the nut 504 from its installed position and thereby enable the nut 504 to maintain the predetermined bearing preload. Preferably, to accomplish this, the ring 506 is disposed about the axle spindle 514 in a clearance-fit therewith, and the ring 506 is "keyed" to the nut 504 and the hub 518 by the pins 508. Preferably, the pins 508 are pressed into respective openings provided in the ring 506 and include inner ends 508A which is received in associated openings formed in the nut 504, and opposite outer ends 508B which is received in associated openings provided in the wheel hub 518. Thus, it can be seen that the nut 504 is operative to preload the bearing assembly 588 to a predetermined load, and the ring 506 and the pins 508 cooperate to prevent rotation of the nut 504 relative to the axle spindle 514 thereby maintaining such preload condition. Alternatively, other means can be provided to preload the bearing assembly 588 and/or to non-rotatably secure the nut 504 on the axle spindle 514 to prevent rotation of the nut 504 so as to maintain such bearing preload condition.

A spindle nut 596 is installed on the external threaded outer end portion 580 of the axle spindle 514 to secure the wheel hub 518, the brake rotor 520, and the wheel 516 to the axle spindle 514 for rotation therewith. Specifically, during installation of the spindle nut 596, the wheel hub 518 moves axially to the right in the drawing until the inboard end 530 of the wheel hub 518 engages a shoulder 594A provided on the axle spindle body 594. Preferably, as illustrated, such movement is operative to slightly space apart the inboard end 530 of the wheel hub 518 from an adjacent outer surface 506A of the ring 506. As a result, the wheel hub 518 does not contact the ring 506 and therefore, is not effective to apply a force to the bearing assembly 588. A cover and/or nut retainer (not shown) can be disposed over the nut 594 and secured to the assembly 500 by suitable means. In the illustrated embodiment, the wheel hub and brake assembly 500 also includes a vehicle wheel speed sensor and tone wheel assembly 510.

The structure of the vehicle wheel hub mounting system 500 is effective to separate the preload of the bearing assembly, provided by the nut 504, from the retention of the wheel hub 518, provided by the spindle nut 596. Thus, the spindle nut 595 can be tightened to a relatively high torque since it does not affect the bearing preload. Thus, the radial and bending loads transmitted from the wheel hub 518 to the spindle splines 584 are reduced thereby reducing spline wear.

Figure 7:
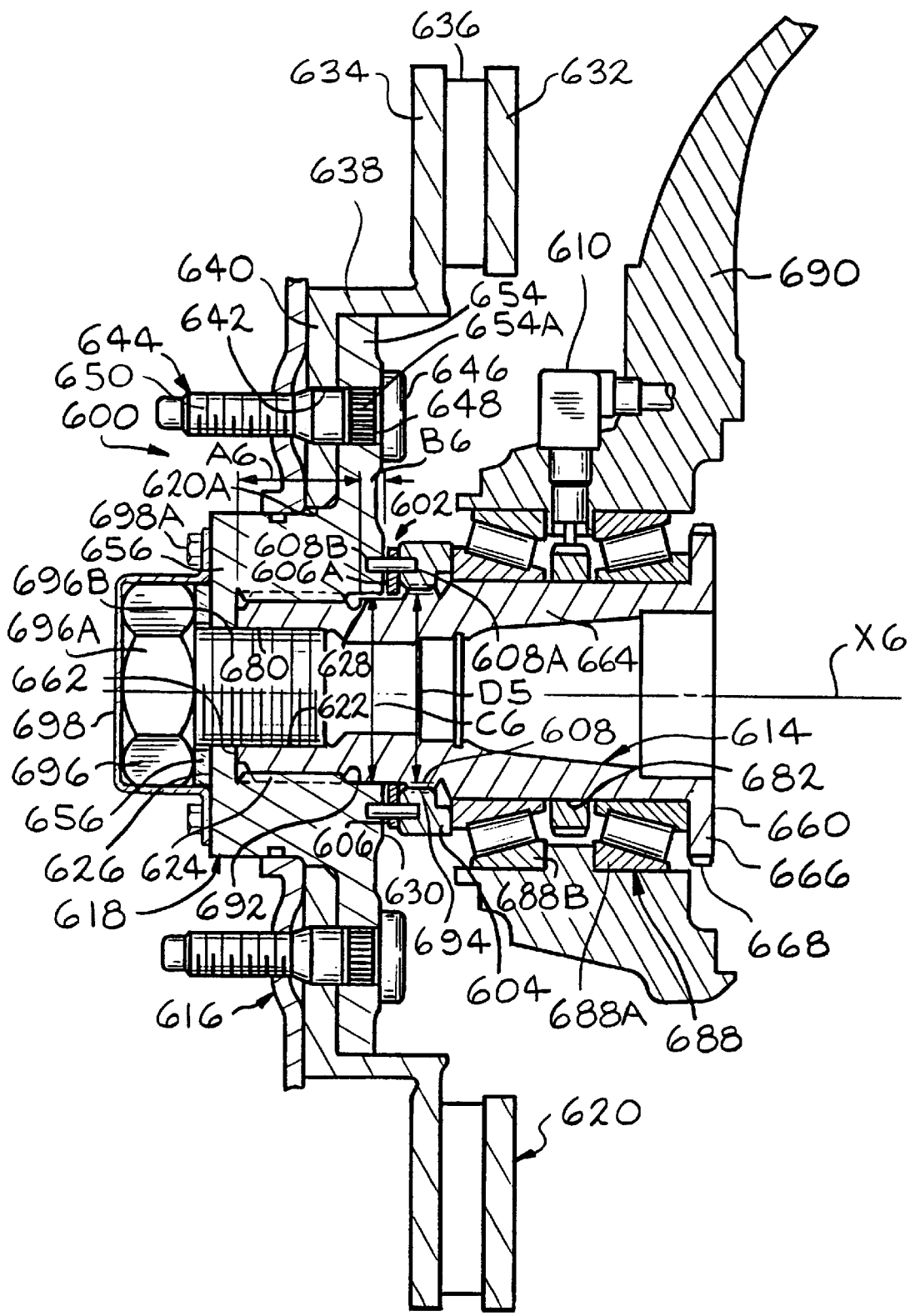
FIG. 7 is a sectional view of a portion of a seventh embodiment of an improved vehicle wheel hub mounting system in accordance with this invention.

FIG. 7 illustrates a seventh embodiment of a vehicle wheel hub mounting system, indicated generally at 600, in accordance with this invention. The illustrated vehicle wheel hub mounting system 600 is associated with a front wheel of a vehicle. The vehicle wheel hub mounting system 600 includes an axle spindle 614, a wheel 616, a wheel hub 618, and a brake rotor 620.

The wheel hub 618 defines an axis X6 and includes a centrally located internal bore 622, an opened outboard end 626, and an opened inboard end 630. The internal bore 622 is provided with internal splines 624 adjacent the outboard end 626 thereof, and with an inner annular wheel hub surface 628 adjacent the inboard end 630 thereof. The internal splines 624 extend from the outboard end 626 toward the inboard end 630 a predetermined axial distance A6. The inner annular wheel hub surface 628 extends from the inboard end 630 toward the outboard end 626 a predetermined axial distance B6 which is less than the distance A6, and defines a predetermined wheel hub inner diameter D6. Alternatively, the distance B6 can be greater than or generally equal to the distance A6. As will be discussed, the wheel hub internal splines 624 are operative to connect the wheel hub 614 to the axle spindle 614 for rotation therewith, and the annular wheel hub inner surface 628 is operative to pilot and support the wheel hub 618 on the axle spindle 614.

The wheel hub 618 further includes a radially outwardly extending inboard flange 654, and a radially inwardly extending outboard flange 656. The flange 654 includes a plurality of stud receiving holes 654A (only two one of such stud receiving holes 654A is shown in FIG. 7) equally spaced circumferentially on the flange 654 about the internal bore 622.

The brake rotor 620 is ventilated and includes a pair of opposed friction plates 632 and 634 which are spaced apart from one another by a plurality of intermediate ribs or posts 636 in a well known manner. The friction plate 634 of the rotor 620 is connected by a circumferentially extending wall 638 to an inner mounting flange portion 640. The inner mounting flange portion 640 of the rotor 640 includes a centrally located pilot hole 620A and a plurality of stud receiving holes 642 (only two of such stud receiving holes 642 is shown in FIG. 7) equally spaced circumferentially on the rotor 620 about the pilot hole 620A.

A mounting stud 644 is provided to secure the brake rotor 620, the wheel hub 618, and the wheel 616 together for rotation with one another. Each mounting stud 644 includes an enlarged inner head 646, an intermediate body portion 648 provided with serrations formed along a portion thereof, and an outer main body portion 650 provided with external threads. The mounting stud 644 extends through the hole 654A formed in the flange portion 654 of the wheel hub 618, through the hole 642 formed in the mounting flange portion 640 of the brake rotor 620, and through a hole 652 provided in the wheel 616. The serrations of the intermediate body portion 648 of the mounting stud 644 frictionally engage a side wall of the stud receiving hole 654A to secure the stud 644 to the flange portion 654 of the wheel hub 618. A nut (not shown) is installed on the threaded outer end 650 of the mounting stud 644 to thereby secure the wheel 616 to the wheel hub 618 and the brake rotor 620 together for rotation with one another.

The axle spindle 614 is a hollow shaft and includes an opened inboard end 660, a closed outboard end 662, and a generally axially extending main body 664. The inboard end 660 of the axle spindle 614 includes a generally radially outwardly extending flange 666. In the illustrated embodiment, the flange 666 includes a splined outer end 668 which is adapted to be selectively coupled to splines (not shown) provided on a half-shaft (not shown) by a selectable shift-lock mechanism (not shown). The half-shaft is rotatably supported relative to the axle spindle 614 and is adapted to be rotatably connected to an axle shaft (not shown) for rotation therewith during 4×4 wheel driving applications. The shift-lock mechanism is adapted to be secured to a non-rotatable vehicle component, such as a steering knuckle 690, by suitable means. Alternatively, the spindle 614 can be a hollow shaft (not shown) and include an opened outboard end.

The main body 664 of the axle spindle 614 has a stepped configuration and is provided with an internal threaded outer end portion 680, an external splined outer end portion 684, an outer annular axle spindle surface 692, an external threaded intermediate portion 694, and a bearing seat 682. The external splined portion 684 of the axle spindle 614 receives the internal splines 624 of the internal bore 622 of the wheel hub 618 in a mating connection therewith to rotatably connect the wheel hub 618 to the axle spindle 614 for rotation therewith. The outer annular axle spindle surface 692 defines a predetermined axle spindle outer diameter C6.

A bearing assembly 688 is pressed onto the bearing seat 682 of the axle spindle 614. In the illustrated embodiment, the bearing assembly 688 includes an single row tapered inboard roller bearing 688A and a single row tapered outboard roller bearing 688B. However, the bearing assembly 688 can be other than illustrated if desired. For example, the bearing assembly 688 can be a pregreased, sealed-for-life cartridge type bearing assembly (not shown).

The wheel hub inner surface 628 is disposed about and piloted on the outer annular axle spindle surface 692 of the body 664 of the axle spindle 614. Preferably, to accomplish this, the inner diameter D6 of the inner wheel hub surface 628 is slightly greater than the outer diameter C6 defined by the outer axle spindle surface 692 so as to provide a clearance-fit therewith, as shown in the upper portion of FIG. 7 (the clearance between the outer axle spindle surface 692 and the inner wheel hub surface 628 shown exaggerated for clarity). Alternatively, the inner diameter D6 of the inner wheel hub surface 628 can be slightly less than or generally equal to the outer diameter C6 of the outer axle spindle surface 692 so as to provide a press-fit therewith, as shown in the lower portion of FIG. 7.

The vehicle wheel hub mounting system 600 further includes a bearing preload assembly, indicated generally at 602. The bearing preload assembly 602 includes an internal threaded nut 604, an annular ring 606, and a plurality of pins 608 (only two of such pins 608 are illustrated in FIG. 7). The nut 604 is threaded on the external threaded portion 694 of the axle spindle 614 and tightened against the outboard bearing 688A in order to clamp the bearing assembly 688 between the nut 604 and the flange 666 of the axle spindle 614. As a result, the nut 604 is operative to preload the bearing assembly 688 to a predetermined load.

The ring 606 and pins 608 are provided to prevent rotation of the nut 604 from its installed position and thereby enable the nut 604 to maintain the predetermined bearing preload. Preferably, to accomplish this, the ring 606 is disposed about the axle spindle 614 in a clearance-fit therewith, and the ring 566 is "keyed" to the nut 604 and the hub 618 by the pins 608. Preferably, the pins 608 are pressed into respective openings provided in the ring 604 and include inner ends 608A which are received in associated openings formed in the nut 604, and opposite outer ends 608B which are received in respective openings provided in the wheel hub 618. Thus, it can be seen that the nut 604 is operative to preload the bearing assembly 688 to a predetermined load, and the ring 606 and pins 608 cooperate to prevent rotation of the nut 604 relative to the axle spindle 614 thereby maintaining such preload condition. Alternatively, other means can be provided to preload the bearing assembly 688 and/or to non-rotatably secure the nut 604 on the axle spindle 614 to prevent rotation of the nut 604 so as to maintain such bearing preload condition.

A capscrew 696 is installed on the internal threaded outer end portion 680 of the axle spindle 614 to secure the wheel hub 618, the brake rotor 620, and the wheel 616 to the axle spindle 614 for rotation therewith. The capscrew 696 includes an enlarged hexagon head 696A and an external threaded body 696B. Preferably, a washer 656 is installed on the capscrew 696 prior to assembly. Alternatively, other means can be used to secure the wheel hub 618, the brake rotor 620, and the wheel 616 to the axle spindle 614 for rotation therewith. For example, the outboard end of the axle spindle 614 can extend to the left in the drawing (not shown) past the flange 656 so as to enable a conventional spanner nut to be installed on an external threaded outer end thereof.

During installation of the capscrew 696, the wheel hub 618 moves axially to the right in the drawing until the flange 656 of the hub 618 engages the outer end 662 of the axle spindle 614. Preferably, as illustrated, such movement is operative to slightly space apart the inboard end 630 of the hub 618 from an adjacent outer surface 606A of the ring 606. As a result, the wheel hub 618 does not contact the ring 606 and therefore, is not effective to apply a force to the bearing assembly 688. A cover 698 is installed over the capscrew 696 to prevent water, dirt, and other debris from entering therein. Preferably, the cover 698 has a configuration which corresponds to the configuration of the outer end of the capscrew 696 so as to function as a retainer and prevent rotation of the capscrew 696. The cover 698 is secured to the hub 618 by suitable means, such as fasteners 698A which are received in threaded openings provided in the outboard end 626 of the wheel hub 618. In the illustrated embodiment, the wheel hub and brake assembly 600 also includes a vehicle wheel speed sensor and tone wheel assembly 610.

The structure of the vehicle wheel hub mounting system 600 is effective to separate the preload of the bearing assembly, provided by the nut 604, from the retention of the wheel hub 618, provided by the capscrew 696. Thus, the capscrew 695 can be tightened to a relatively high torque since it does not affect the bearing preload. Thus, the radial and bending loads transmitted from the wheel hub 618 to the spindle splines 684 are reduced thereby reducing spline wear.

Figure 8:
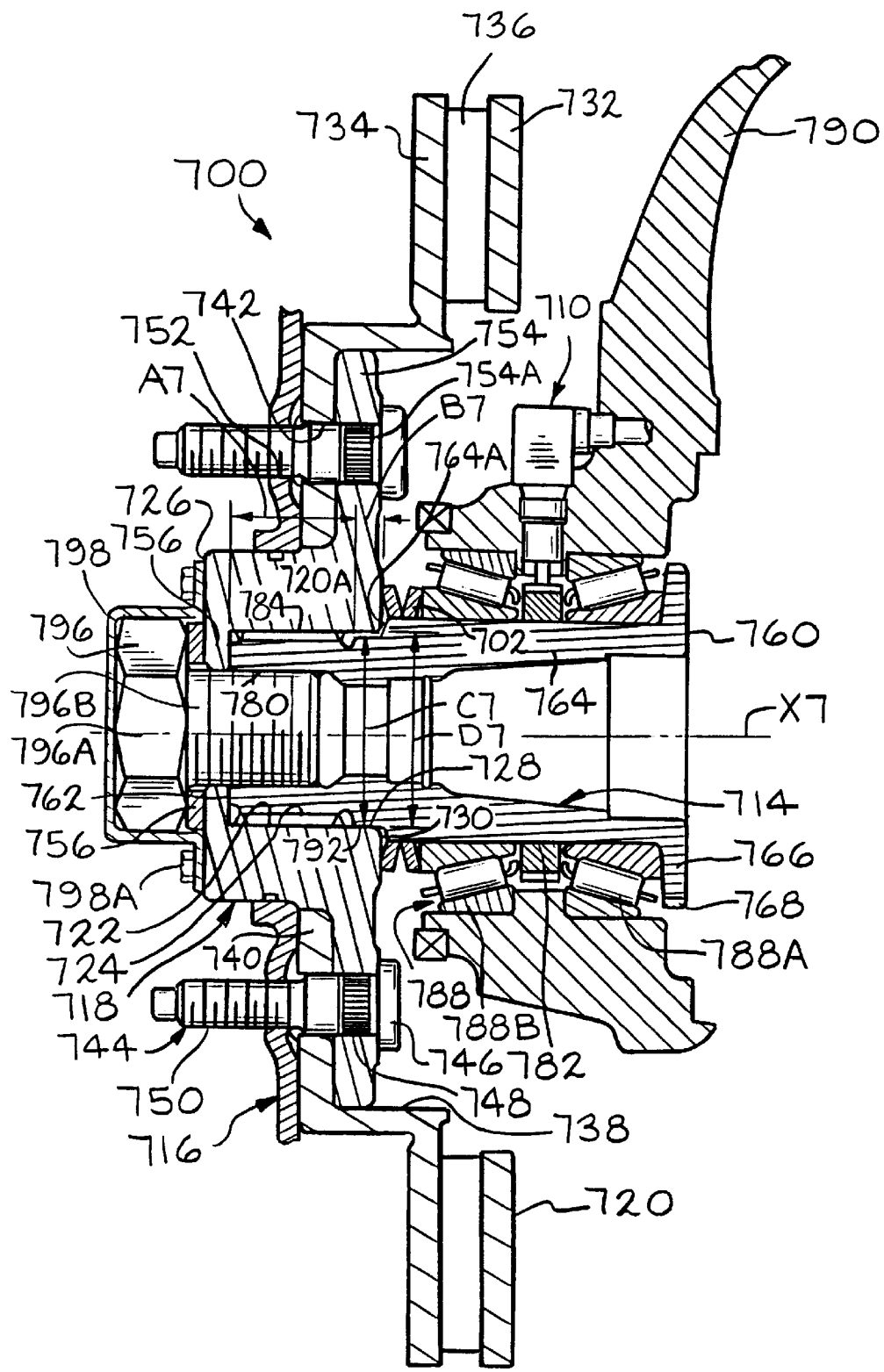
FIG. 8 is a sectional view of a portion of an eighth embodiment of an improved vehicle wheel hub mounting system in accordance with this invention.

FIG. 8 illustrates an eighth embodiment of a vehicle wheel hub mounting system, indicated generally at 700, in accordance with this invention. The illustrated vehicle wheel hub mounting system 700 is associated with a front wheel of a vehicle. The vehicle wheel hub mounting system 700 includes an axle spindle 714, a wheel 716, a wheel hub 718, and a brake rotor 720.

The wheel hub 718 defines an axis X7 and includes a centrally located internal bore 722, an opened outboard end 726, and an opened inboard end 730. The internal bore 722 is provided with internal splines 724 adjacent the outboard end 726 thereof, and with an inner annular wheel hub surface 728 adjacent the inboard end 730 thereof. The internal splines 724 extend from the outboard end 726 toward the inboard end 730 a predetermined axial distance A7. The inner annular wheel hub surface 728 extends from the inboard end 730 toward the outboard end 726 a predetermined axial distance B7 which is less than the distance A7, and defines a predetermined wheel hub inner diameter D7. Alternatively, the distance B7 can be greater than or generally equal to the distance A7. As will be discussed, the wheel hub internal splines 724 are operative to connect the wheel hub 714 to the axle spindle 714 for rotation therewith, and the annular wheel hub inner surface 728 is operative to pilot and support the wheel hub 718 on the axle spindle 714.

The wheel hub 718 further includes a radially outwardly extending inboard flange 754, and a radially inwardly extending outboard flange 756. The inboard flange 754 includes a plurality of stud receiving holes 754A (only two of such stud receiving holes 754A is shown in FIG. 8) equally spaced circumferentially on the flange 754 about the internal bore 722.

The brake rotor 720 is ventilated and includes a pair of opposed friction plates 732 and 734 which are spaced apart from one another by a plurality of intermediate ribs or posts 736 in a well known manner. The friction plate 734 of the rotor 720 is connected by a circumferentially extending wall 738 to an inner mounting flange portion 740. The inner mounting flange portion 740 of the rotor 740 includes a centrally located pilot hole 720A and a plurality of stud receiving holes 742 (only two of such stud receiving holes 742 is shown in FIG. 8) equally spaced circumferentially on the rotor 720 about the pilot hole 720A.

A mounting stud 744 is provided to secure the brake rotor 720, the wheel hub 718, and the wheel 716 together for rotation with one another. Each mounting stud 744 includes an enlarged inner head 746, an intermediate body portion 748 provided with serrations formed along a portion thereof, and an outer main body portion 750 provided with external threads. The mounting stud 744 extends through the hole 754A formed in the flange portion 754 of the wheel hub 718, through the hole 742 formed in the mounting flange portion 740 of the brake rotor 720, and through a hole 752 provided in the wheel 716. The serrations of the intermediate body portion 748 of the mounting stud 744 frictionally engage a side wall of the stud receiving hole 754A to secure the stud 744 to the flange portion 754 of the wheel hub 718. A nut (not shown) is installed on the threaded outer end 750 of the mounting stud 744 to thereby secure the wheel 716 to the wheel hub 718 and the brake rotor 720 together for rotation with one another.

The axle spindle 714 is a hollow shaft and includes an opened inboard end 760, an opened outboard end 762, and a generally axially extending main body 764. The inboard end 760 of the axle spindle 714 includes a generally radially outwardly extending flange. 766. In the illustrated embodiment, the flange 766 includes a splined outer end 768 which is adapted to be selectively coupled to splines (not shown) provided on a half-shaft (not shown) by a selectable shift-lock mechanism (not shown). The half-shaft is rotatably supported relative to the axle spindle 714 and is adapted to be rotatably connected to an axle shaft (not shown) for rotation therewith during 4×4 wheel driving applications. The shift-lock mechanism is adapted to be secured to a non-rotatable vehicle component, such as a steering knuckle 790, by suitable means.

The main body 764 of the axle spindle 714 has a stepped configuration and is provided with an internal threaded outer end portion 780, an external splined outer end portion 784, an outer annular axle spindle surface 792, and a bearing seat 782. The external splined portion 784 of the axle spindle 714 receives the internal splines 724 of the internal bore 722 of the wheel hub 718 in a mating connection therewith to rotatably connect the wheel hub 718 to the axle spindle 714 for rotation therewith. The outer annular axle spindle surface 792 defines a predetermined axle spindle outer diameter C7.

A bearing assembly 788 is pressed onto the bearing seat 782 of the axle spindle 714. In the illustrated embodiment, the bearing assembly 788 includes an single row tapered inboard roller bearing 788A and a single row tapered outboard roller bearing 788B. However, the bearing assembly 788 can be other than illustrated if desired. For example, the bearing assembly 788 can be a pregreased, sealed-for-life cartridge type bearing assembly (not shown).

The wheel hub inner surface 728 is disposed about and piloted on the outer annular axle spindle surface 792 of the body 764 of the axle spindle 714. Preferably, to accomplish this, the inner diameter D7 of the inner wheel hub surface 728 is slightly greater than the outer diameter C7 defined by the outer axle spindle surface 792 so as to provide a clearance-fit therewith, as shown in the upper portion of FIG. 8 (the clearance between the outer axle spindle surface 792 and the inner wheel hub surface 728 shown exaggerated for clarity). Alternatively, the inner diameter D7 of the inner wheel hub surface 728 can be slightly less than or generally equal to the outer diameter C7 of the outer axle spindle surface 792 so as to provide a press-fit therewith, as shown in the lower portion of FIG. 8.

The vehicle wheel hub mounting system 700 further includes a spring 702. The spring 702 is disposed about the bearing seat 782 of the axle spindle 714 in a clearance-fit therewith. As will be discussed, the spring 702 is operative to preload the bearing assembly 788 to a predetermined load. In the illustrated embodiment, the spring 702 is a conical spring, such as a belleville spring. However, the spring 702 can be other than illustrated if desired.

A capscrew 796 is installed on the internal threaded outer end portion 780 of the axle spindle 714 to secure the wheel hub 718, the brake rotor 720, and the wheel 716 to the axle spindle 714 for rotation therewith and to preload the bearing assembly 788. The capscrew 796 includes an enlarged hexagon head 796A and an external threaded body 796B. Preferably, a washer 756 is installed on the capscrew 796 prior to assembly. Alternatively, other means can be used to secure the wheel hub 718, the brake rotor 720, and the wheel 716 to the axle spindle 714 for rotation therewith. For example, the outboard end of the axle spindle 714 can extend to the left in the drawing (not shown) past the flange 756 so as to enable a conventional spanner nut to be installed on an external threaded outer end thereof.

During installation of the capscrew 796, the wheel hub 718 moves to the right in the drawing until the flange 756 of the hub 718 engages the outer end 762 of the axle spindle 714. At the same time, the hub 718 engages and moves the spring 702 to the right in the drawing so as to compress the spring 702 between the hub inboard end 730 and the bearing assembly 788 so as to apply a predetermined preload to the bearing assembly 788. Preferably, as illustrated, a gap exists between the inboard end 730 of the hub 718 and an adjacent shoulder 764A of the body portion 764 of the axle spindle 714 when the capscrew 796 has been fully tightened. A cover 798 is installed over the capscrew 796 to prevent water, dirt, and other debris from entering therein. Preferably, the cover 798 has a configuration which corresponds to the configuration of the outer end of the capscrew 796 so as to function as a retainer and prevent rotation of the capscrew 796. The cover 798 is secured to the hub 718 by suitable means, such as fasteners 798A which are received in threaded openings provided in the outboard end 726 of the wheel hub 718. The wheel hub and brake assembly 700 also includes a vehicle wheel speed sensor and tone wheel assembly 710.

The structure of the vehicle wheel hub mounting system 700 is effective to separate the preload of the bearing assembly, provided by the spring 702, from the retention of the wheel hub 718, provided by the capscrew 796. Thus, the capscrew 796 can be tightened to a relatively high torque since it does not affect the bearing preload. Thus, the radial and bending loads transmitted from the wheel hub 718 to the spindle splines 784 are reduced thereby reducing spline wear.

Figure 9:
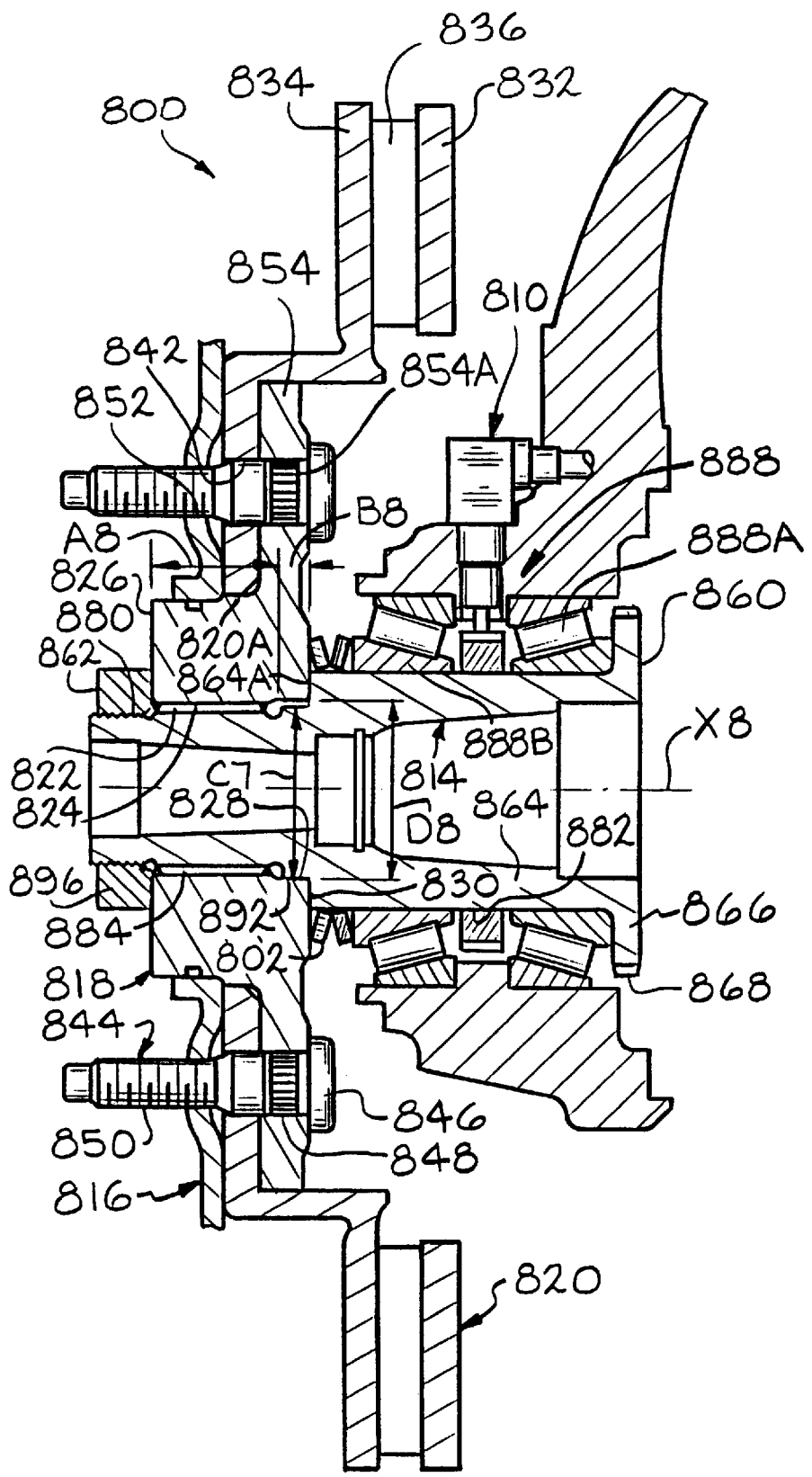
FIG. 9 is a sectional view of a portion of a ninth embodiment of an improved vehicle wheel hub mounting system in accordance with this invention.
Figure 10:
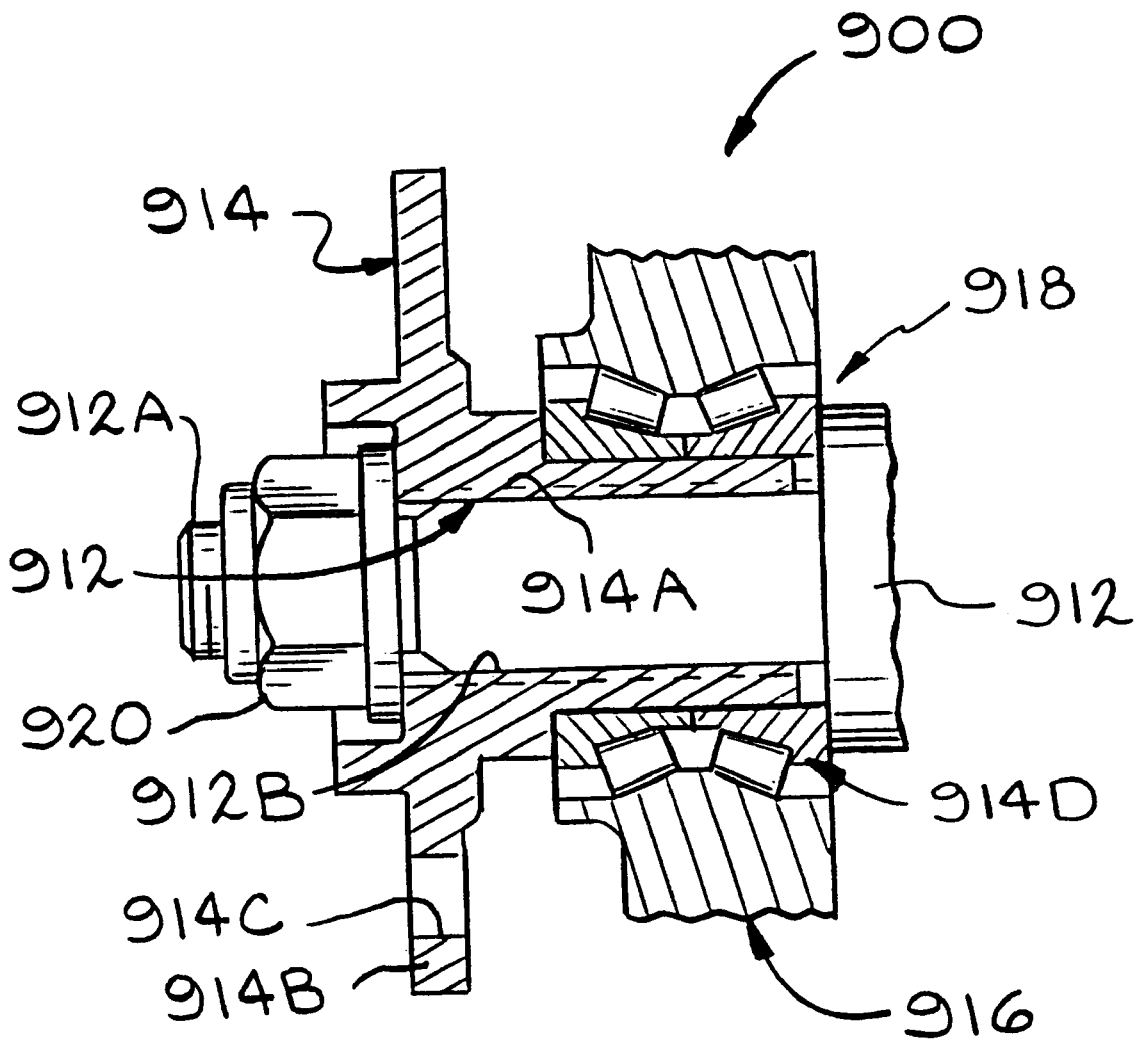
FIG. 10 is a sectional view of a portion of a prior art vehicle wheel hub mounting system.

FIG. 9 illustrates an ninth embodiment of a vehicle wheel hub mounting system, indicated generally at 800, in accordance with this invention. The illustrated vehicle wheel hub mounting system 800 is associated with a front wheel of a vehicle. The vehicle wheel hub mounting system 800 includes an axle spindle 814, a wheel 816, a wheel hub 818, and a brake rotor 820.

The wheel hub 818 defines an axis X8 and includes a centrally located internal bore 822, an opened outboard end 826, and an opened inboard end 830. The internal bore 822 is provided with internal splines 824 adjacent the outboard end 826 thereof, and with an inner annular wheel hub surface 828 adjacent the inboard end 830 thereof. The internal splines 824 extend from the outboard end 826 toward the inboard end 830 a predetermined axial distance A8. The inner annular wheel hub surface 828 extends from the inboard end 830 toward the outboard end 826 a predetermined axial distance B8 which is less than the distance A8, and defines a predetermined wheel hub inner diameter D8. Alternatively, the distance B8 can be greater than or generally equal to the distance A8. As will be discussed, the wheel hub internal splines 824 are operative to connect the wheel hub 814 to the axle spindle 814 for rotation therewith, and the annular wheel hub inner surface 828 is operative to pilot and support the wheel hub 818 on the axle spindle 814.

The wheel hub 818 further includes a radially outwardly extending inboard flange 854. The inboard flange 854 includes a plurality of stud receiving holes 854A (only two one of such stud receiving holes 854A is shown in FIG. 9) equally spaced circumferentially on the flange 854 about the internal bore 822.

The brake rotor 820 is ventilated and includes a pair of opposed friction plates 832 and 834 which are spaced apart from one another by a plurality of intermediate ribs or posts 836 in a well known manner. The friction plate 834 of the rotor 820 is connected by a circumferentially extending wall 838 to an inner mounting flange portion 840. The inner mounting flange portion 840 of the rotor 840 includes a centrally located pilot hole 820A and a plurality of stud receiving holes 842 (only two of such stud receiving holes 842 is shown in FIG. 9) equally spaced circumferentially on the rotor 820 about the pilot hole 820A.

A mounting stud 844 is provided to secure the brake rotor 820, the wheel hub 818, and the wheel 816 together for rotation with one another. Each mounting stud 844 includes an enlarged inner head 846, an intermediate body portion 848 provided with serrations formed along a portion thereof, and an outer main body portion 850 provided with external threads. The mounting stud 844 extends through the hole 854A formed in the flange portion 854 of the wheel hub 818, through the hole 842 formed in the mounting flange portion 840 of the brake rotor 820, and through a hole 852 provided in the wheel 816. The serrations of the intermediate body portion 848 of the mounting stud 844 frictionally engage a side wall of the stud receiving hole 854A to secure the stud 844 to the flange portion 854 of the wheel hub 818. A nut (not shown) is installed on the threaded outer end 850 of the mounting stud 844 to thereby secure the wheel 816 to the wheel hub 818 and the brake rotor 820 together for rotation with one another.

The axle spindle 814 is a hollow shaft and includes an opened inboard end 860, an opened outboard end 862, and a generally axially extending main body 864. The inboard end 860 of the axle spindle 814 includes a generally radially outwardly extending flange 866. In the illustrated embodiment, the flange 866 includes a splined outer end 868 which is adapted to be selectively coupled to splines (not shown) provided on a half-shaft (not shown) by a selectable shift-lock mechanism (not shown). The half-shaft is rotatably supported relative to the axle spindle 814 and is adapted to be rotatably connected to an axle shaft (not shown) for rotation therewith during 4×4 wheel driving applications. The shift-lock mechanism is adapted to be secured to a non-rotatable vehicle component, such as a steering knuckle 890, by suitable means. Alternatively, the structure of the axle spindle 814 can be other than illustrated if desired. For example, the axle spindle 814 can include a closed outboard end (not shown).

The main body 864 of the axle spindle 814 has a stepped configuration and is provided with an external threaded outer end portion 880, an external splined portion 884, an outer annular axle spindle surface 892, an external threaded portion 894, and a bearing seat 882. The external splined portion 884 of the axle spindle 814 receives the internal splines 824 of the internal bore 822 of the wheel hub 818 in a mating connection therewith to rotatably connect the wheel hub 818 to the axle spindle 814 for rotation therewith. The outer annular axle spindle surface 892 defines a predetermined axle spindle outer diameter C8.

A bearing assembly 888 is pressed onto the bearing seat 882 of the axle spindle 814. In the illustrated embodiment, the bearing assembly 888 includes an single row tapered inboard roller bearing 888A and a single row tapered outboard roller bearing 888B. However, the bearing assembly 888 can be other than illustrated if desired. For example, the bearing assembly 888 can be a pregreased, sealed-for-life cartridge type bearing assembly (not shown).

The wheel hub inner surface 828 is disposed about and piloted on the outer annular axle spindle surface 892 of the body 864 of the axle spindle 814. Preferably, to accomplish this, the inner diameter D8 of the inner wheel hub surface 828 is slightly greater than the outer diameter C8 defined by the outer axle spindle surface 892 so as to provide a clearance-fit therewith, as shown in the upper portion of FIG. 9 (the clearance between the outer axle spindle surface 892 and the inner wheel hub surface 828 shown exaggerated for clarity). Alternatively, the inner diameter D8 of the inner wheel hub surface 828 can be slightly less than or generally equal to the outer diameter C8 of the outer axle spindle surface 892 so as to provide a press-fit therewith, as shown in the lower portion of FIG. 9.

The vehicle wheel hub mounting system 800 further includes a spring 802. The spring 802 is disposed about the bearing seat 882 of the axle spindle 814 in a clearance-fit therewith. As will be discussed, the spring 802 is operative to preload the bearing assembly 888 to a predetermined load. In the illustrated embodiment, the spring 802 is illustrated as being a conical spring, such as for example, a belleville spring. However, the spring 802 can be other than illustrated if desired.

A spindle nut 896 is installed on the external threaded outer end portion 880 of the axle spindle 814 to secure the wheel hub 818, the brake rotor 820, and the wheel 816 to the axle spindle 814 for rotation therewith and to preload the bearing assembly 888. In particular, during installation of the spindle nut 896, the wheel hub 818 moves to the right in the drawing until the inboard end 830 of the hub 818 engages a shoulder 864A provided on the axle spindle 814. At the same time, the hub 818 engages and moves the spring 802 to the right in the drawing so as to compress the spring 802 between the hub inboard end 830 and the bearing assembly 888 so as to apply a predetermined preload to the bearing assembly 888. A cover and/or nut retainer (not shown) can be disposed over the nut 896 and secured to the assembly 800 by suitable means. The wheel hub and brake assembly 800 also includes a vehicle wheel speed sensor and tone wheel assembly 810.

The structure of the vehicle wheel hub mounting system 800 is effective to separate the preload of the bearing assembly, provided by the spring 802, from the retention of the wheel hub 818, provided by the spindle nut 896. Thus, the spindle nut 896 can be tightened to a relatively high torque since it does not affect the bearing preload. Thus, the radial and bending loads transmitted from the wheel hub 818 to the spindle splines 884 are reduced thereby reducing spline wear.

Although the invention has been described and illustrated in connection with the particular vehicle wheel hub mounting systems disclosed herein, it will be appreciated that the invention may be used in connection with other vehicle hub mounting systems. For example, the invention may be used in connection with a vehicle wheel hub mounting system wherein the brake component is a brake drum; or in connection with a vehicle wheel hub mounting system wherein the brake component is of a drum-in-hat type of brake assembly wherein the brake assembly includes a disc service brake and a drum-in-hat parking and emergency brake; or in connection with a vehicle wheel hub mounting system wherein the associated vehicle wheel is a non-driven wheel; or in connection with a vehicle wheel hub mounting system wherein the associated vehicle wheel is a fill time driven wheel.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle wheel hub mounting system comprising:

a wheel hub defining an axis and including a generally axially extending body having a radially outwardly extending flange defining a shoulder, said body having bore formed therethrough, said bore including an internal splined portion and an inner annular non-splined wheel hub surface spaced apart from said internal splined portion, said inner annular non-splined wheel hub surface defining a predetermined wheel hub inner diameter, said wheel hub including a bearing seat;

an axle spindle connected to said wheel hub for rotation therewith, said axle spindle including a generally axially extending body including an inboard end and an outboard end, said inboard end having a generally radially outwardly extending flange, said body having an external splined portion and an outer annular non-splined axle spindle surface spaced apart from said external splined portion, said external splined portion of said axle spindle matingly receiving said internal splined portion of said wheel hub to connect said axle spindle to said wheel hub for rotation therewith, said outer annular non-splined axle spindle surface of said axle spindle defining a predetermined axle spindle outer diameter for receiving said inner non-splined annular wheel hub surface of said wheel hub so as to support said wheel hub thereon;

a bearing assembly disposed on said bearing seat of said wheel hub radially adjacent only said inner annular non-splined wheel hub surface, said bearing assembly adapted to be secured to a non-rotatable component of the vehicle so as to rotatably support said wheel hub and said axle spindle relative thereto; and retention means secured to said axle spindle for preloading said bearing assembly between said shoulder of said wheel hub and said flange of said inboard end of said axle spindle and for securing said wheel hub and said axle spindle together for rotation with one another.

2. The vehicle wheel hub mounting system defined in claim 1 wherein said bearing assembly is disposed entirely on said bearing seat of said wheel hub.

3. The vehicle wheel hub mounting system defined in claim 1 further including means for fixedly securing said retention means to said axle spindle to prevent relative movement therebetween.

4. The vehicle wheel hub mounting system defined in claim 1 wherein said retention means is a capscrew, said capscrew having threads which are adapted to be threadably received in threads provided on said outboard end of said axle spindle.

5. The vehicle wheel hub mounting system defined in claim 4 further including a retainer means secured to said wheel hub, said retainer means being disposed about said capscrew so as to prevent relative movement thereof.

6. The vehicle wheel hub mounting system defined in claim 1 wherein said retention means is a nut, said nut adapted to be threadably installed on a threaded portion of said outboard end of said axle spindle.

7. The vehicle wheel hub mounting system defined in claim 1 wherein said flange of said inboard end of said spindle includes an outer end provided with splines.

8. The vehicle wheel hub mounting system defined in claim 1 wherein said predetermined wheel hub inner diameter is slightly greater than said predetermined axle spindle outer diameter.

9. The vehicle wheel hub mounting system defined in claim 1 wherein said predetermined wheel hub inner diameter is slightly less than or generally equal to said predetermined axle spindle outer diameter.

10. The vehicle wheel hub mounting system defined in claim 1 wherein said internal splined portion of said wheel hub extends a first axial distance and said inner annular non-splined wheel hub surface extends a second axial distance which is greater than said first axial distance.

11. A vehicle wheel hub mounting system comprising:
a wheel hub defining an axis and including a generally axially extending body having a radially outwardly extending flange defining a shoulder, said body having bore formed therethrough, said bore including an internal splined portion and an inner annular non-splined wheel hub surface spaced apart from said internal splined portion, said inner annular non-splined wheel hub surface defining a predetermined wheel hub inner diameter, said wheel hub including a bearing seat;

an axle spindle connected to said wheel hub for rotation therewith, said axle spindle including a generally axially extending body including an inboard end and an outboard end, said inboard end having a generally radially outwardly extending flange provided with splined outer end, said body having an external splined portion and an outer annular non-splined axle spindle surface spaced apart from said external splined portion, said external splined portion of said axle spindle matingly receiving said internal splined portion of said wheel hub to connect said axle spindle to said wheel hub for rotation therewith, said outer annular non-splined axle spindle surface of said axle spindle defining a predetermined axle spindle outer diameter for receiving said inner annular non-splined wheel hub surface of said wheel hub so as to support said wheel hub thereon;

a bearing assembly disposed entirely on said bearing seat of said wheel hub radially adjacent only said inner annular non-splined wheel hub surface, said bearing assembly adapted to be secured to a non-rotatable component of the vehicle so as to rotatably support said wheel hub and said axle spindle relative thereto; and retention means secured to said axle spindle for preloading said bearing assembly between said shoulder of said wheel hub and said flange of said inboard end of said axle spindle and for securing said wheel hub and said axle spindle together for rotation with one another.

12. The vehicle wheel hub mounting system defined in claim 11 further including means for fixedly securing said retention means to said axle spindle to prevent relative movement therebetween.

13. The vehicle wheel hub mounting system defined in claim 12 wherein said retention means is a capscrew, said capscrew having threads which are adapted to be threadably received in threads provided on said outboard end of said axle spindle.

14. The vehicle wheel hub mounting system defined in claim 13 further including a retainer means secured to said wheel hub, said retainer means being disposed about said capscrew so as to prevent relative movement thereof.

15. The vehicle wheel hub mounting system defined in claim 11 wherein said retention means is a nut, said nut adapted to be threadably installed on a threaded portion of said outboard end of said axle spindle.

16. The vehicle wheel hub mounting system defined in claim 11 wherein said predetermined wheel hub inner diameter is slightly greater than said predetermined axle spindle outer diameter.

17. The vehicle wheel hub mounting system defined in claim 11 wherein said predetermined wheel hub inner diameter is slightly less than or generally equal to said predetermined axle spindle outer diameter.

18. The vehicle wheel hub mounting system defined in claim 11 wherein said internal splined portion of said wheel hub extends a first axial distance and said inner annular non-splined wheel hub surface extends a second axial distance which is greater than said first axial distance.

19. A vehicle wheel hub mounting system comprising:
a wheel hub defining an axis and including a generally axially extending body having a radially outwardly extending flange defining a shoulder, said body having bore formed therethrough, said bore including an internal splined portion and an inner annular non-splined wheel hub surface spaced apart from said internal splined portion, said inner annular non-splined wheel hub surface defining a predetermined wheel hub inner diameter, said wheel hub including a bearing seat;

an axle spindle connected to said wheel hub for rotation therewith, said axle spindle including a generally axially extending body including an inboard end and an outboard end, said inboard end having a generally radially outwardly extending flange and said outboard end provided with a threaded end portion, said body having an external splined portion and an outer annular non-splined axle spindle surface spaced apart from said external splined portion, said external splined portion of said axle spindle matingly receiving said internal splined portion of said wheel hub to connect said axle spindle to said wheel hub for rotation therewith, said outer annular non-splined axle spindle surface of said axle spindle defining a predetermined axle spindle outer diameter for receiving said inner annular non-splined wheel hub surface of said wheel hub so as to support said wheel hub thereon;

a bearing assembly disposed entirely on said bearing seat of said wheel hub radially adjacent only said inner annular non-splined wheel hub surface, said bearing assembly adapted to be secured to a non-rotatable component of the vehicle so as to rotatably support said wheel hub and said axle spindle relative thereto; and a nut disposed on said threaded end portion of said axle spindle for preloading said bearing assembly between said shoulder of said wheel hub and said flange of said inboard end of said axle spindle and for securing said wheel hub and said axle spindle together for rotation with one another.

20. The vehicle wheel hub mounting system defined in claim 19 wherein said flange of said inboard end of said spindle includes an outer end provided with to splines.

21. The vehicle wheel hub mounting system defined in claim 19 further including means for fixedly securing said nut on said axle spindle to prevent relative movement therebetween.

22. The vehicle wheel hub mounting system defined in claim 19 wherein said predetermined wheel hub inner diameter is slightly greater than said predetermined axle spindle outer diameter.

23. The vehicle wheel hub mounting system defined in claim 19 wherein said predetermined wheel hub inner diameter is slightly less than or generally equal to said predetermined axle spindle outer diameter.

24. The vehicle wheel hub mounting system defined in claim 19 wherein said internal splined portion of said wheel hub extends a first axial distance and said inner annular non-splined wheel hub surface extends a second axial distance which is greater than said first axial distance.

* * * * *